United States Patent
Hirota et al.

(10) Patent No.: US 9,904,225 B2
(45) Date of Patent: Feb. 27, 2018

(54) IMAGE FORMING APPARATUS

(71) Applicant: CANON KABUSHIKI KAISHA, Tokyo (JP)

(72) Inventors: Yusuke Hirota, Ebina (JP); Hisashi Nakahara, Numazu (JP); Akihiko Uchiyama, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/461,760

(22) Filed: Mar. 17, 2017

(65) Prior Publication Data

US 2017/0277093 A1    Sep. 28, 2017

(30) Foreign Application Priority Data

Mar. 22, 2016  (JP) .................. 2016-057714
Feb. 6, 2017   (JP) .................. 2017-019608

(51) Int. Cl.
*G03G 15/32*   (2006.01)
*G03G 15/06*   (2006.01)
*G03G 15/00*   (2006.01)

(52) U.S. Cl.
CPC .......... *G03G 15/321* (2013.01); *G03G 15/06* (2013.01); *G03G 15/751* (2013.01); *G03G 2215/00126* (2013.01)

(58) Field of Classification Search
CPC .................. G03G 15/321; G03G 2215/00126
See application file for complete search history.

(56) References Cited

U.S. PATENT DOCUMENTS 7,639,956 B2 *  12/2009  Naito ................. G03G 15/043
                                                399/26
2015/0370206 A1   12/2015  Hitosugi et al.

FOREIGN PATENT DOCUMENTS

| JP | H10-076735 A |   | 3/1998 |
|----|--------------|---|--------|
| JP | H10-243127 A |   | 9/1998 |
| JP | 2001-103282 A |   | 4/2001 |
| JP | 2001103282 A | * | 4/2001 |
| JP | 2011-099933 A |   | 5/2011 |
| JP | 2013-210489 A |   | 10/2013 |
| JP | 2013210489 A | * | 10/2013 |
| WO | 2004/102283 A1 |   | 11/2004 |

OTHER PUBLICATIONS

European Search Report dated Jun. 22, 2017, in related European Patent Application No. 17161987.7.

* cited by examiner

*Primary Examiner* — Victor Verbitsky
(74) *Attorney, Agent, or Firm* — Fitzpatrick, Cella, Harper & Scinto

(57) ABSTRACT

In a first image formation mode, an image is formed with a first development contrast C1 and a specific dot pattern is formed with a second development contrast C2, which is lower than the first development contrast C1; in a second image formation mode, an image is formed with a third development contrast C3 and a specific dot pattern is formed with a fourth development contrast C4, which is lower than the third development contrast C3; and when ΔC1 (=C2/C1) denotes a ratio between the second development contrast C2 and the first development contrast C1, and ΔC2 (=C4/C3) denotes a ratio between the fourth development contrast C4 and the third development contrast C3, ΔC2<ΔC1 is satisfied.

14 Claims, 12 Drawing Sheets

IMAGE FORMING APPARATUS

BACKGROUND OF THE INVENTION

Field of the Invention

The present invention relates to an image forming apparatus which forms an image on a recording medium using an electrophotographic technique.

Description of the Related Art

Conventionally, in image forming apparatuses such as laser beam printers, an in-line color system is known in which a plurality of image forming stations are arranged in parallel in a movement direction of an intermediate transfer belt. With an image forming apparatus adopting the in-line color system, first, an electrostatic latent image is formed on a surface of a photosensitive drum in the plurality of image forming stations. The electrostatic latent image formed on the photosensitive drum is developed by a developing apparatus as a toner image. In addition, toner images of respective colors formed at the plurality of image forming stations are primarily transferred onto the intermediate transfer belt so as to overlap with each other. Furthermore, the toner images of the respective colors primarily transferred onto the intermediate transfer belt are secondarily transferred onto a sheet such as a sheet of paper. Subsequently, as the sheet onto which the toner images have been secondarily transferred is subjected to heat and pressure by a fixing apparatus, the toner images are fixed to the sheet. In this manner, an image is formed on the sheet. In this case, density of the image formed on the sheet is desirably consistent with density desired by a user. In addition, a tinge of the image formed on the sheet is also desirably consistent with a tinge desired by the user.

In consideration thereof, in the technique disclosed in Japanese Patent Application Laid-open No. 2013-210489, a color gamut of an image is enlarged and an upper limit value of density of the image is increased by causing a peripheral velocity difference between a photosensitive drum and a developing roller to vary. In addition, the technique disclosed in Japanese Patent Application Laid-open No. 2013-210489 suppresses toner scattering, image thinning, and the like which are caused when the peripheral velocity difference between the photosensitive drum and the developing roller is increased. Specifically, instead of increasing the peripheral velocity difference between the photosensitive drum and the developing roller by increasing a peripheral velocity of the developing roller, the peripheral velocity difference between the photosensitive drum and the developing roller is increased by reducing a peripheral velocity of the photosensitive drum. Accordingly, toner scattering, image thinning, and the like are suppressed.

In addition, recently, the widespread use of image forming apparatuses capable of printing images with high image quality in a stable manner has given rise to a new problem in that paper currency, securities, and the like can be easily printed using a full-color image forming apparatus. In order to solve this problem, with a technique disclosed in Japanese Patent Application Laid-open No. H10-076735, a regular dot pattern indicating a machine number of an image forming apparatus is applied to a sheet of paper when printing an image. Accordingly, when, for instance, printed matter resembling paper currency is discovered, a machine number can be deduced from the dot pattern applied to the paper currency and an image forming apparatus used to print the printed matter can be identified.

Furthermore, with a technique disclosed in Japanese Patent Application Laid-open No. 2001-103282, density in a vicinity of a portion where a dot pattern indicating information related to an image forming apparatus is added on a sheet is detected and the dot pattern is changed in accordance with the density in the vicinity of the portion. Specifically, when the vicinity of the portion where the dot pattern is added has high density, the dot pattern is made recognizable by reducing spacing among dots constituting the dot pattern. On the other hand, when the vicinity of the portion where the dot pattern is added has low density, the dot pattern is made less visible by increasing the spacing among the dots constituting the dot pattern.

SUMMARY OF THE INVENTION

However, when the technique disclosed in Japanese Patent Application Laid-open No. 2013-210489 is adopted with respect to the techniques disclosed in Japanese Patent Application Laid-open No. H10-076735 and Japanese Patent Application Laid-open No. 2001-103282, increased density of an image may cause a dot pattern applied to a sheet of paper to become visible. Specifically, in an image forming apparatus which forms a visually-unidentifiable dot pattern for identifying a manufacturer or the like on a sheet of paper, when increasing image density by adjusting a peripheral velocity ratio between a photosensitive drum and a developing roller, density of the dot pattern also increases. In this case, there is a risk that a favorable image can no longer be obtained because the increased density causes the dot pattern applied to the sheet of paper to become visually identifiable by a user.

In consideration thereof, an object of the present invention is to provide a technique which enables a favorable image to be obtained even when changing a peripheral velocity ratio between an image bearing member and a developer bearing member during image formation.

In order to achieve the object described above, an image forming apparatus according to the present invention is an image forming apparatus, comprising:

a rotatable image bearing member on which an electrostatic image is formed;

a rotatable developer bearing member supplying a developer to the image bearing member and developing the electrostatic image; and processing portion for processing image information so as to add a specific dot pattern to an image to be formed, wherein the image forming apparatus is capable of executing:

a first image formation mode in which an image is formed based on the image information by setting a peripheral velocity ratio Vd/Vdr between a peripheral velocity Vd of the developer bearing member and a peripheral velocity Vdr of the image bearing member to a first peripheral velocity ratio $\Delta V1$; and a second image formation mode in which an image is formed based on the image information by setting the peripheral velocity ratio Vd/Vdr to a second peripheral velocity ratio $\Delta V2$, which is higher than the first peripheral velocity ratio $\Delta V1$, in the first image formation mode, the image forming apparatus forms an image with a first development contrast C1 and forms the specific dot pattern with a second development contrast C2, which is lower than the first development contrast C1, in the second image formation mode, the image forming apparatus forms an image with a third development contrast C3 and forms the specific dot pattern with a fourth development contrast C4, which is lower than the third development contrast C3, and when $\Delta C1$ (=C2/C1) denotes a ratio between the second development contrast C2 and the first development contrast C1, and $\Delta C2$ (=C4/C3) denotes a ratio between the fourth development contrast C4 and the third development contrast C3, $\Delta C2 < \Delta C1$ is satisfied.

In order to achieve the object described above, an image forming apparatus according to the present invention is an image forming apparatus, comprising:

a rotatable image bearing member on which an electrostatic image is formed;

a rotatable developer bearing member supplying a developer to the image bearing member and developing the electrostatic image; and processing portion for processing image information so as to add a specific dot pattern to an image to be formed, wherein the image forming apparatus is capable of executing:

a first image formation mode in which an image is formed based on the image information by setting a peripheral velocity ratio Vd/Vdr between a peripheral velocity Vd of the developer bearing member and a peripheral velocity Vdr of the image bearing member to a first peripheral velocity ratio $\Delta V1$; and a second image formation mode in which an image is formed based on the image information by setting the peripheral velocity ratio Vd/Vdr to a second peripheral velocity ratio $\Delta V2$, which is higher than the first peripheral velocity ratio $\Delta V1$, in the first image formation mode, the image forming apparatus forms an image with a first development contrast C1 and forms the specific dot pattern with a second development contrast C2 which is lower than the first development contrast C1, in the second image formation mode, the image forming apparatus forms an image with a third development contrast C3 and forms the specific dot pattern with a fourth development contrast C4 which is lower than the third development contrast C3, and when $\Delta C1$ (=|C2−C1|) denotes an absolute value of a difference between the second development contrast C2 and the first development contrast C1, and $\Delta C2$ (=|C4−C3|) denotes an absolute value of a difference between the fourth development contrast C4 and the third development contrast C3, $\Delta C2 < \Delta C1$ is satisfied.

In addition, in order to achieve the objects described above, an image forming apparatus according to the present invention is an image forming apparatus, comprising:

a rotatable image bearing member on which an electrostatic image is formed;

a rotatable developer bearing member supplying a developer to the image bearing member and developing the electrostatic image; and processing portion for processing image information so as to add a specific dot pattern to an image to be formed, wherein the image forming apparatus is capable of executing:

a first image formation mode in which an image is formed based on the image information by setting a peripheral velocity ratio Vd/Vdr between a peripheral velocity Vd of the developer bearing member and a peripheral velocity Vdr of the image bearing member to a first peripheral velocity ratio $\Delta V1$; and a second image formation mode in which an image is formed based on the image information by setting the peripheral velocity ratio Vd/Vdr to a second peripheral velocity ratio $\Delta V2$, which is higher than the first peripheral velocity ratio $\Delta V1$, and the image forming apparatus sets spacing between two adjacent dots among a plurality of dots forming the specific dot pattern in the second image formation mode wider than spacing between the two dots in the first image formation mode.

In addition, in order to achieve the object described above, an image forming apparatus according to the present invention is an image forming apparatus, comprising:

a rotatable image bearing member on which an electrostatic image is formed;

a rotatable developer bearing member supplying a developer to the image bearing member and developing the electrostatic image; and processing portion for processing image information so as to add a specific dot pattern to an image to be formed, wherein the image forming apparatus is capable of executing:

a first image formation mode in which an image is formed based on the image information by setting a peripheral velocity ratio Vd/Vdr between a peripheral velocity Vd of the developer bearing member and a peripheral velocity Vdr of the image bearing member to a first peripheral velocity ratio $\Delta V1$; and a second image formation mode in which an image is formed based on the image information by setting the peripheral velocity ratio Vd/Vdr to a second peripheral velocity ratio $\Delta V2$, which is higher than the first peripheral velocity ratio $\Delta V1$, in the first image formation mode, the image forming apparatus forms an image by supplying the developer to the image bearing member so that a region corresponding to the image has a first developer volume level M1 and forms the specific dot pattern by supplying the developer to the image bearing member so that a region corresponding to the specific dot pattern has a second developer volume level M2, which is lower than the first developer volume level M1, in the second image formation mode, the image forming apparatus forms an image by supplying the developer to the image bearing member so that a region corresponding to the image has a third developer volume level M3 and forms the specific dot pattern by supplying the developer to the image bearing member so that a region corresponding to the specific dot pattern has a fourth developer volume level M4, which is lower than the third developer volume level M3, and when $\Delta M1$ (=M2/M1) denotes a ratio between the second developer volume level M2 and the first developer volume level M1, and $\Delta M2$ (=M4/M3) denotes a ratio between the fourth developer volume level M4 and the third developer volume level M3, $\Delta M2 < \Delta M1$ is satisfied.

In addition, in order to achieve the object described above, an image forming apparatus according to the present invention is an image forming apparatus, comprising:

a rotatable image bearing member on which an electrostatic image is formed;

a rotatable developer bearing member supplying a developer to the image bearing member and developing the electrostatic image; and processing portion for processing image information so as to add a specific dot pattern to an image to be formed, wherein the image forming apparatus is capable of executing:

a first image formation mode in which an image is formed based on the image information by setting a peripheral velocity ratio Vd/Vdr between a peripheral velocity Vd of the developer bearing member and a peripheral velocity Vdr of the image bearing member to a first peripheral velocity ratio ΔV1; and a second image formation mode in which an image is formed based on the image information by setting the peripheral velocity ratio Vd/Vdr to a second peripheral velocity ratio ΔV2, which is higher than the first peripheral velocity ratio ΔV1, in the first image formation mode, the image forming apparatus forms an image by supplying the developer to the image bearing member so that a region corresponding to the image has a first developer volume level M1 and forms the specific dot pattern by supplying the developer to the image bearing member so that a region corresponding to the specific dot pattern has a second developer volume level M2, which is lower than the first developer volume level M1, in the second image formation mode, the image forming apparatus forms an image by supplying the developer to the image bearing member so that a region corresponding to the image has a third developer volume level M3 and forms the specific dot pattern by supplying the developer to the image bearing member so that a region corresponding to the specific dot pattern has a fourth developer volume level M4, which is lower than the third developer volume level M3, and when ΔM1 (=|M2−M1|) denotes an absolute value of a difference between the second developer volume level M2 and the first developer volume level M1, and ΔM2 (=|M4−M3|) denotes an absolute value of a difference between the fourth developer volume level M4 and the third developer volume level M3, ΔM2<ΔM1 is satisfied.

In addition, in order to achieve the object described above, an image forming apparatus according to the present invention is an image forming apparatus, comprising:

an image bearing member on which an electrostatic image is formed;

a developer bearing member for supplying a developer to the image bearing member and developing the electrostatic image; and processing portion for processing image information so as to add a specific dot pattern to an image to be formed, wherein the image forming apparatus is capable of executing:

a first image formation mode in which an image is formed based on the image information by setting a peripheral velocity ratio Vd/Vdr between a peripheral velocity Vd of the developer bearing member and a peripheral velocity Vdr of the image bearing member to a first peripheral velocity ratio ΔV1; and a second image formation mode in which an image is formed based on the image information by setting the peripheral velocity ratio Vd/Vdr to a second peripheral velocity ratio ΔV2, which is higher than the first peripheral velocity ratio ΔV1, wherein, compared to the first image formation mode, in the second image formation mode, density of the specific dot pattern is increased at a rate lower than another rate at which density of a dot pattern of the image other than the specific dot pattern is increased.

The present invention enables a favorable image to be obtained even when forming an image by setting a higher peripheral velocity ratio than a prescribed peripheral velocity ratio.

Further features of the present invention will become apparent from the following description of exemplary embodiments with reference to the attached drawings.

DESCRIPTION OF THE EMBODIMENTS

Figure 1:
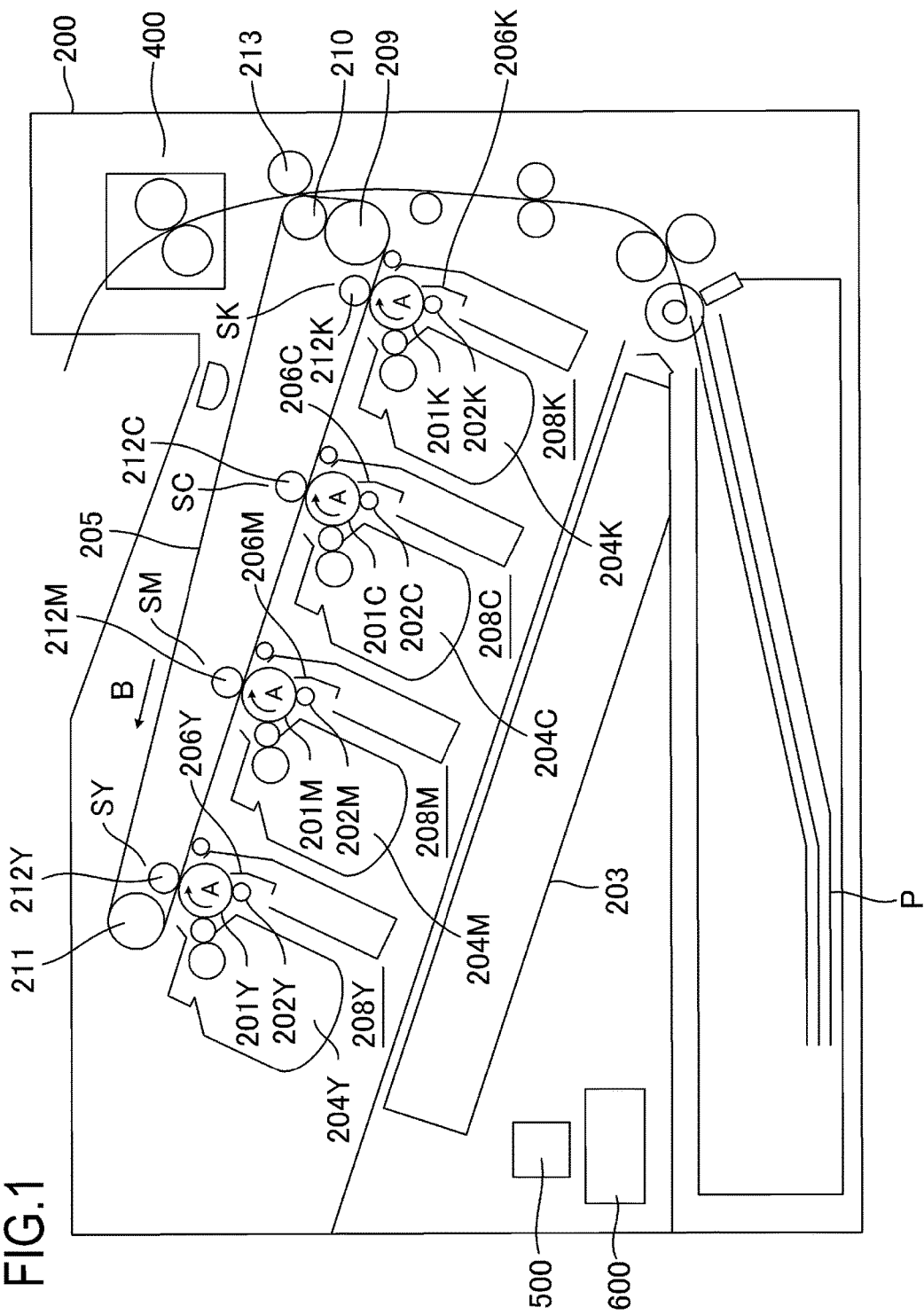
FIG. 1 is a schematic sectional view of an image forming apparatus according to a first embodiment.

Modes for carrying out the present invention are illustratively explained in detail below on the basis of embodiments with reference to the drawings. However, dimensions, materials, and shapes of components described in the embodiments, relative arrangement of the components, and the like should be changed as appropriate according to the configuration of an apparatus to which the invention is applied and various conditions. That is, the dimensions, the materials, the shapes, and the relative arrangement are not intended to limit the scope of the present invention to the embodiments.

First Embodiment

<Overall Configuration of Image Forming Apparatus 200>

The present embodiment enables execution of a normal image formation mode in which an image is formed with normal density and a wide-color gamut image formation mode in which a color gamut of an image is enlarged by changing a peripheral velocity ratio Vd/Vdr between a peripheral velocity Vdr of a photosensitive drum 201 and a peripheral velocity Vd of a developing roller 302. The respective image formation modes differ from each other in the peripheral velocity ratio between the photosensitive drum 201 as an image bearing member and the developing roller 302 as a developer bearing member. In this case, the peripheral velocity ratio between the photosensitive drum 201 and the developing roller 302 is expressed as peripheral velocity ratio=peripheral velocity of developing roller 302÷peripheral velocity of photosensitive drum 201×100 (%). In a portion where the photosensitive drum and the developing roller are in contact with each other, when the photosensitive drum and the developing roller rotate in a same direction as depicted, the peripheral velocity ratio is as follows. When the photosensitive drum is rotating at 200 mm/sec and the developing roller at 200 mm/sec, the peripheral velocity ratio is 100%. On the other hand, when the photosensitive drum and the developing roller rotate in different directions in the contact portion, the peripheral velocity ratio is −100%.

In the normal image formation mode, toner as a developer adhered to the developing roller 302 is conveyed to the photosensitive drum 201 by an action of a development contrast between a potential of an electrostatic latent image as an electrostatic image formed on the photosensitive drum 201 and a potential of the developing roller 302. Accordingly, the electrostatic latent image as an electrostatic image formed on the photosensitive drum 201 as an image bearing member is developed as a toner image. On the other hand, in the wide-color gamut image formation mode, by increasing the peripheral velocity ratio between the photosensitive drum 201 and the developing roller 302, a toner supply amount per unit area from the developing roller 302 to the photosensitive drum 201 is increased. Accordingly, due to the action of the development contrast between the potential of an electrostatic latent image formed on the photosensitive drum 201 as an image bearing member and the potential of the developing roller, a maximum amount of toner adherable to the developing roller 302 is conveyed to the photosensitive drum 201.

Hereinafter, a process cartridge 208 and the image forming apparatus 200 according to the present embodiment will be described. FIG. 1 is a schematic sectional view of the image forming apparatus 200 according to the first embodiment. The image forming apparatus 200 according to the present embodiment is an in-line system full-color laser printer adopting an intermediate transfer system. The image forming apparatus 200 is capable of forming a full-color image on a recording material P (for example, recording paper) as a recording medium in accordance with image information. The image information is input to a CPU 20 provided inside the image forming apparatus 200 from an image reading apparatus (not shown) which is connected to the image forming apparatus 200 or from a host device (not shown) such as a personal computer which is connected to the image forming apparatus 200 so as to be capable of communication.

In addition, as a plurality of image forming portions, the image forming apparatus 200 includes first, second, third, and fourth image forming portions S (SY, SM, SC, and SK) for forming images of the respective colors of yellow (Y), magenta (M), cyan (C), and black (K). In this case, the image forming portion S includes the process cartridge 208 and primary transfer rollers 212 (212Y to 212K) which are arranged so as to oppose the photosensitive drum 201 via an intermediate transfer belt 205. In the present embodiment, the first to fourth image forming portions SY to SK are arranged in a single row in a direction intersecting both vertical and horizontal directions. Moreover, in the present embodiment, configurations and operations of the first to fourth image forming portions SY to SK are substantially the same with the exception of differences in colors of images formed. Therefore, unless the image forming portions must be distinguished from one another, the suffixes Y, M, C, and K will be omitted and the image forming portions will be collectively described. However, the present invention is not limited to this configuration and, alternatively, a configuration may be adopted in which black (K) has a larger shape and the image forming portion thereof is also larger than the other image forming portions. In addition, a configuration including a fifth image forming portion using white toner or transparent toner is also valid.

As a plurality of image bearing members, the image forming apparatus 200 includes four photosensitive drums 201 which are drum-shaped electrophotographic photoreceptors arranged parallel to each other in a direction intersecting the vertical direction. The photosensitive drum 201 as an image bearing member is rotationally driven in a direction of an arrow A (clockwise) in FIG. 1 by a driving force of a motor (refer to FIG. 2). In addition, a charging roller 202 as charging means configured to uniformly charge a surface of the photosensitive drum 201 and a scanner unit 203 configured to form an electrostatic latent image on the photosensitive drum 201 by irradiating a laser based on image information are arranged in a periphery of the photosensitive drum 201.

In addition, a developing unit 204 configured to develop an electrostatic image as a toner image and a cleaning blade 206 configured to remove toner as a developer remaining on the surface of the photosensitive drum 201 after the toner image is transferred are arranged in the periphery of the photosensitive drum 201 as an image bearing member. Furthermore, a preliminary exposure LED 216 configured to eliminate a potential on the photosensitive drum 201 is arranged in the periphery of the photosensitive drum 201. In addition, the intermediate transfer belt 205 for transferring a toner image on the photosensitive drum 201 to a recording material P as a recording medium is arranged so as to oppose the four photosensitive drums 201.

The photosensitive drum 201 as an image bearing member, the charging roller 202, the developing unit 204, and the cleaning blade 206 are integrally configured as the process cartridge 208. The process cartridge 208 is configured to be attachable and detachable to and from an apparatus main body of the image forming apparatus 200. In addition, in the present embodiment, all of the process cartridges 208 for the respective colors have a same shape, and toners as developers of the respective colors of yellow (Y), magenta (M), cyan (C), and black (K) are housed in the process cartridges 208. Furthermore, as the toners as developers in the present embodiment, toners having negative-charging characteristics are used. While the present embodiment is described using a process cartridge in which a photosensitive drum and a developing unit are integrally configured, this configuration is not restrictive. A configuration may be adopted in which a photosensitive unit including a photosensitive drum and a developing unit including a developer bearing member are respectively configured to be separately attachable and detachable to and from an apparatus main body of an image forming apparatus. In a similar manner, while the toners according to the present embodiment are one-component developers, two-component developers or magnetic toners may be used depending on the configuration.

The intermediate transfer belt 205 formed by an endless belt is in contact with all of the photosensitive drums 201 and moves in a direction of an arrow B (counterclockwise) in FIG. 1. In addition, the intermediate transfer belt 205 is stretched over a driver roller 209, a secondary transfer opposing roller 210, and a driven roller 211. Four primary transfer rollers 212 are arranged parallel to each other on a side of an inner peripheral surface of the intermediate transfer belt 205 so as to oppose each photosensitive drum 201. Furthermore, a bias having an opposite polarity (in the present embodiment, a positive polarity) to a normal charging polarity of the toners is applied to the primary transfer rollers 212 from a primary transfer bias power supply (not shown). Accordingly, a toner image on the photosensitive drum 201 is transferred onto the intermediate transfer belt 205.

In addition, a secondary transfer roller 213 is arranged at a position opposing the secondary transfer opposing roller 210 on a side of an outer peripheral surface of the intermediate transfer belt 205. Furthermore, a bias having an opposite polarity to the normal charging polarity of the toners is applied to the secondary transfer roller 213 from a secondary transfer bias power supply (not shown). Accordingly, a toner image on the intermediate transfer belt 205 is transferred onto the recording material P as a recording medium.

<Configuration of Process Cartridge 208>

Figure 2:
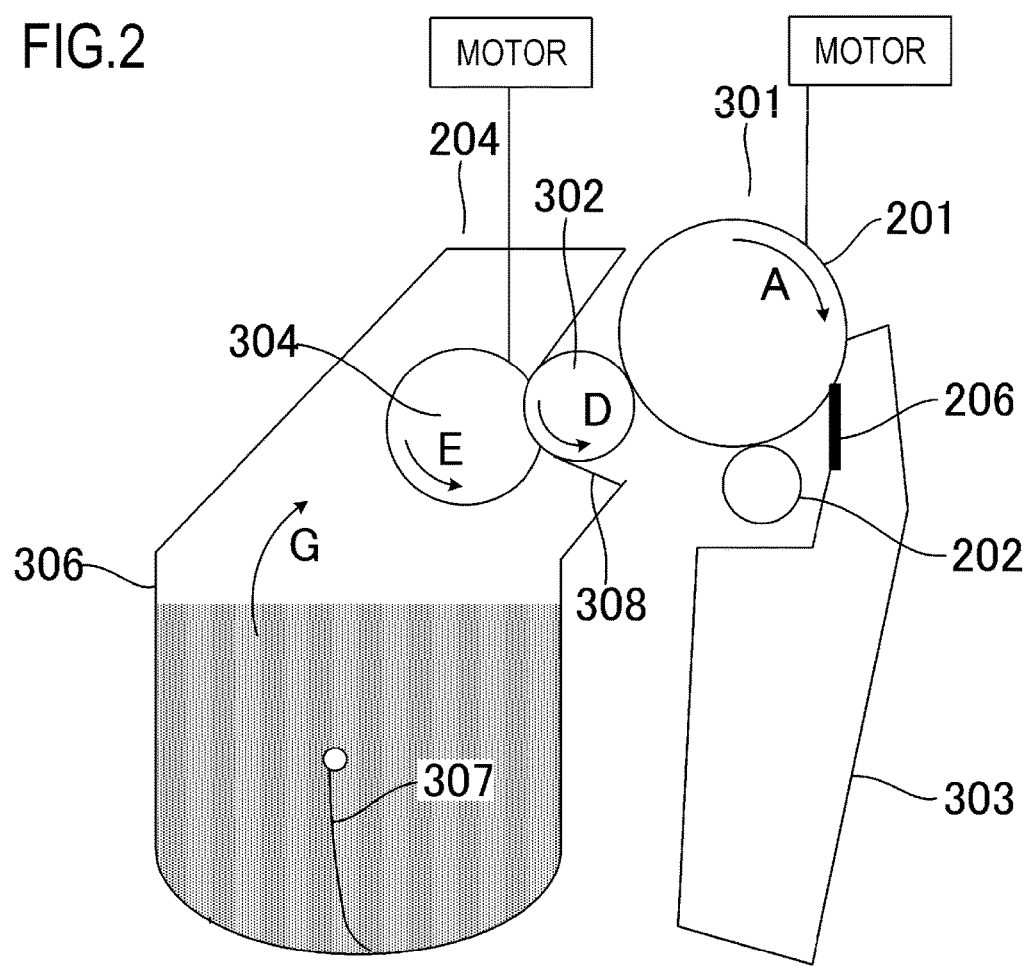
FIG. 2 is a schematic sectional view of a process cartridge according to the first embodiment.

Next, an overall configuration of the process cartridge 208 to be attached to and detached from the image forming apparatus 200 according to the present embodiment will be described with reference to FIG. 2. FIG. 2 is a schematic sectional view of the process cartridge 208 according to the first embodiment. Specifically, FIG. 2 is a schematic sectional view of the process cartridge 208 as viewed from an axial direction of a center of rotation of the photosensitive drum 201. Moreover, in the present embodiment, configurations and operations of the process cartridges 208 of the respective colors are the same with the exception of types (colors) of toners housed therein. Obviously, a configuration and operations of each process cartridge can be changed as appropriate depending on the configuration.

The process cartridge 208 includes a photoreceptor unit 301 including the photosensitive drum 201 as an image bearing member and the like and the developing unit 204 including the developing roller 302 as a developer bearing member and the like. The photoreceptor unit 301 includes a cleaning frame body 303 which supports various elements in the photoreceptor unit 301. The photosensitive drum 201 is rotatably attached to the cleaning frame body 303 via a bearing member (not shown). In addition, the photosensitive drum 201 as an image bearing member is rotationally driven in the direction of the arrow A (clockwise) in FIG. 2 in accordance with an image forming operation as a driving force of a motor (refer to FIG. 2) is transferred to the photoreceptor unit 301.

As the photosensitive drum 201 configured to perform a central role of an image forming process, an organic photoreceptor is used in which an outer circumferential surface of an aluminum cylinder is sequentially coated with an undercoat layer, a carrier generation layer, and a carrier transfer layer which are functional membranes. In addition, the cleaning blade 206 and the charging roller 202 are arranged in the photoreceptor unit 301 so as to come into contact with a circumferential surface of the photosensitive drum 201. Furthermore, untransferred toner removed from the surface of the photosensitive drum 201 by the cleaning blade 206 is housed in the cleaning frame body 303.

The charging roller 202 which is charging means is driven so as to follow the photosensitive drum 201 when a roller portion made of conductive rubber is brought into pressure contact with the photosensitive drum 201. Prescribed DC voltage is applied to a core of the charging roller 202 and, accordingly, a uniform dark-part potential (Vd) is formed on the surface of the photosensitive drum 201. In addition, as described earlier, the scanner unit 203 as an exposing apparatus exposes the photosensitive drum 201 with laser light which is emitted in correspondence with image data.

Subsequently, as charges on the surface of the photosensitive drum 201 are eliminated by a carrier from the carrier generation layer, the potential of the surface of the exposed photosensitive drum 201 drops. As a result, on the surface of the photosensitive drum 201, a portion exposed by the laser assumes a prescribed light-part potential (V1) and an unexposed portion not exposed by the laser assumes a prescribed dark-part potential (Vd). Accordingly, an electrostatic latent image as an electrostatic image is formed on the photosensitive drum 201.

The developing unit 204 includes the developing roller 302 as a developer bearing member (which rotates in a direction of an arrow D), a developing blade 308, and a toner supplying roller 304 (which rotates in a direction of an arrow E). In addition, the developing unit 204 includes a toner housing chamber 306 which houses the toner as a developer. The toner as a developer is stirred inside the toner housing chamber 306 by an action (a rotation in a direction of an arrow G) of a stirring member 307. In addition, in the present embodiment, a prescribed DC bias is applied to the developing roller 302 as a developer bearing member. Toner adheres to a light-part potential portion of the photosensitive drum 201 due to a potential difference between the photosensitive drum 201 and the developing roller 302 in a developing portion where the photosensitive drum 201 and the developing roller 302 come into contact with each other. Accordingly, an electrostatic latent image as an electrostatic image on the photosensitive drum 201 is visualized.

<Configuration of Fixing Apparatus>

Figure 3:
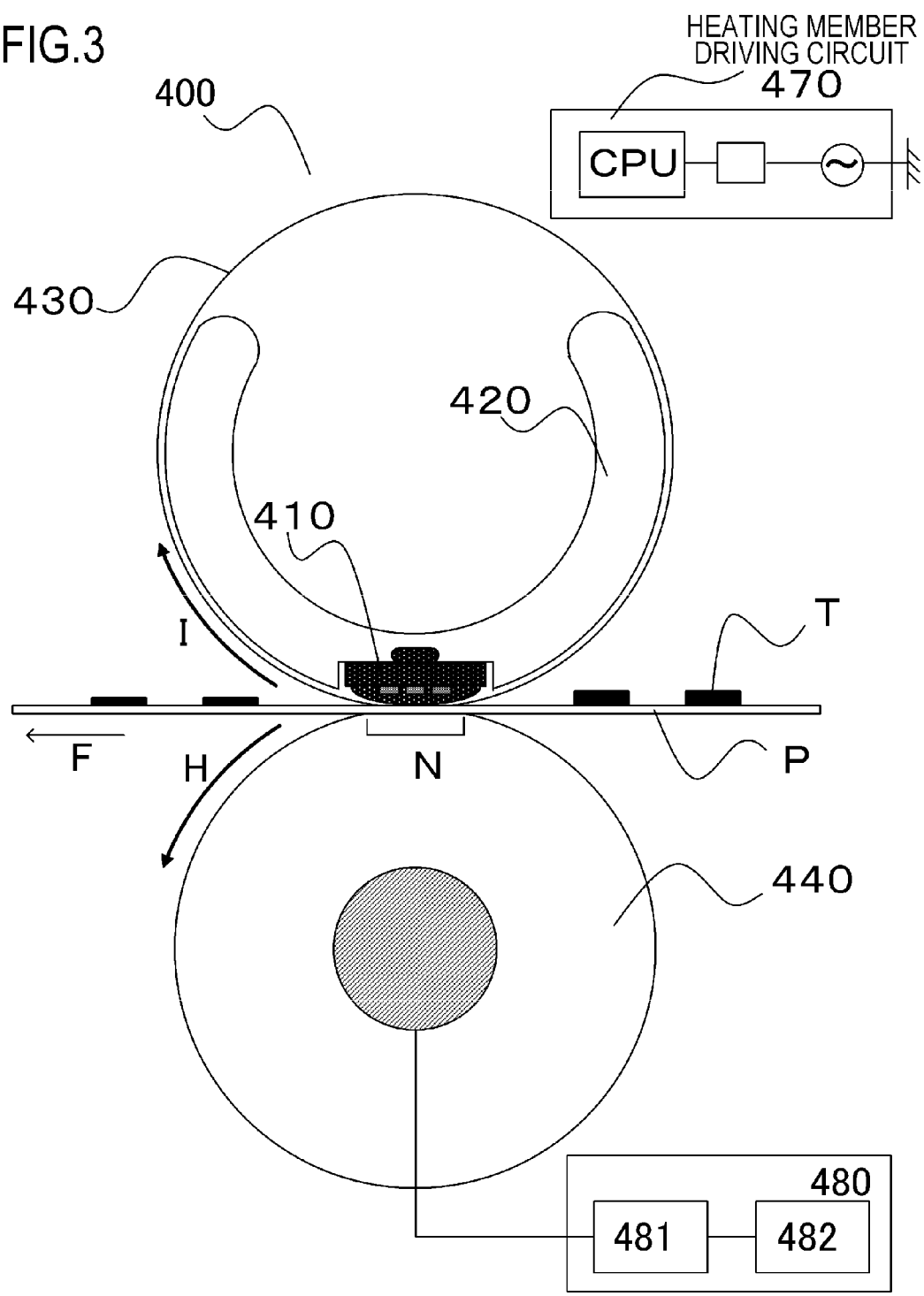
FIG. 3 is a schematic sectional view of a fixing apparatus according to the first embodiment.

FIG. 3 is a schematic sectional view of a fixing apparatus 400 according to the first embodiment. The fixing apparatus 400 according to the present embodiment is a fixing apparatus adopting a pressure roller drive system and includes a heating member 410, a cylindrical film 430 which comes into sliding contact with the heating member 410, and a pressure roller 440 which forms a fixing nip portion N with the heating member 410 via the film 430. In addition, the recording material P as a recording medium is sandwiched and conveyed in the fixing nip portion N and, at the same time, heated by heat from the heating member 410. Accordingly, an unfixed image formed on the recording material P as a recording medium is fixed by heating to the recording material P.

In a state of being held by a heating member supporter 420, the heating member 410 is in pressure contact with a prescribed pressing force with the pressure roller 440 which is a pressing member via the cylindrical film 430 as a flexible member. In addition, the pressure roller 440 is rotationally driven in a direction of an arrow H in FIG. 3 by a rotational driving portion 480. As the pressure roller 440 rotates and slidingly moves against an outer circumferential surface of the film 430, the film 430 rotates in a direction of an arrow I in FIG. 3. Specifically, the film 430 rotates in the direction of the arrow I around the heating member supporter 420 holding the heating member 410.

In addition, the heating member 410 is electrically heated by a heating member driving circuit 470 as power is supplied to the heating member 410 from a commercial power supply. Furthermore, the heating member 410 is controlled to a prescribed temperature adjusted for printing. In this state, the recording material P bearing an unfixed toner image T is sandwiched and conveyed in a direction of an arrow F in the fixing nip portion N. Furthermore, as heat from the heating member 410 is applied to the recording material P via the film 430, the unfixed toner image T is fixed to the recording material P. Subsequently, the recording material P having passed the fixing nip portion N is separated in a curving manner from a surface of the film 430 and then discharged. Moreover, in the fixing apparatus 400 according to the present embodiment, a reference of paper passage of the recording material P is set to a central portion in a longitudinal direction (a direction perpendicular to the direction of the arrow F of the recording material P) of each member.

As the cylindrical film 430, for example, a thin film cylinder with a thickness of around 30 μm to 100 μm and which uses a polyimide or SUS as a base layer is used. In addition, releasability from the toner is maintained by coating the base layer with PFA, PTFA and the like via a primer layer. Furthermore, a slide grease (not shown) is applied between an inner circumferential surface of the film 430 and the heating member supporter 420 and, accordingly, slidability between the film 430 and the heating member supporter 420 is maintained.

The pressure roller 440 is a rotating body in which, for example, an elastic layer such as silicone rubber is formed on a core. In addition, in the present embodiment, a releasing layer with a thickness of around 10 to 100 μm and which is made of FEP, PFA, or the like is provided on the base layer via a primer layer. Accordingly, releasability from the toner is maintained. In addition, the heating member supporter 420 is formed of a highly heat-resistant resin such as PPS, PAI, PI, PEEK, and liquid crystal polymer having a heat insulating property, high heat resistance, and rigidity or a composite material of the resin and ceramics, metal, glass, or the like. In this case, PPS stands for polyphenylene sulfide, PAI stands for polyamide-imide, PI stands for polyimide, and PEEK stands for polyether ether ketone. Furthermore, the rotational driving portion 480 includes a motor 481 which rotationally drives the pressure roller 440, a control portion (CPU) 482 which controls rotation of the motor 481, and the like. As the motor 481, for example, a DC motor or a stepping motor can be used.

<Explanation of Traceable Pattern>

In the present embodiment, a dot pattern invisible to the naked eye is formed on the recording material P on which an image is formed. Accordingly, a machine number of an image forming apparatus which is a manufacturer can be deduced from the applied dot pattern. Therefore, an image forming apparatus which is a manufacturer having printed paper currency can be identified. This system is generally referred to as a traceable pattern system. A traceable pattern is normally formed using yellow toner which has low visibility. In addition, a traceable pattern indicates various pieces of information on an output device such as a name of a manufacturer, a model name, a machine number, and an output status during output of an image to the recording material P. Moreover, in the present embodiment, a dot pattern formed by a plurality of dots is used as a traceable pattern. Positions where the dot pattern is added onto an image are obtained by means such as converting, based on a certain rule, information to be superimposed. Various rules are conceivable for conversion into positional information. For example, in a conceivable case, a machine number or a model name of a printer main body is expressed by a binary sequence and "1" and "0" are respectively expressed by a presence or an absence of a dot pattern. However, methods are not particularly limited in the present embodiment. In addition, in the present embodiment, an image formed on the recording material P by the image forming apparatus 200 is a digital image formed by a plurality of dots. Furthermore, a traceable pattern is read using a dedicated reading apparatus. An appropriate process of converting a dot pattern into information is performed in reverse to a process of converting information to be superimposed into the dot pattern. Accordingly, the machine number or the model name of the printer main body having output printed matter can be identified. Moreover, in the present embodiment, a toner volume level of a traceable pattern is set to 60% or lower of a toner volume level of portions other than the traceable pattern (portions corresponding to "other than the dot pattern"). In other words, the toner volume level of a traceable pattern is 60% or lower of the toner volume level of portions where a normal image is formed. In addition, in the present embodiment, a size of dots constituting a traceable pattern changes depending on laser output. Specifically, the scanner unit 203 irradiates the photosensitive drum 201 with a laser in accordance with image information converted by a printer driver. Furthermore, the size of dots constituting a traceable pattern is determined in accordance with output of the laser.

Figure 4:
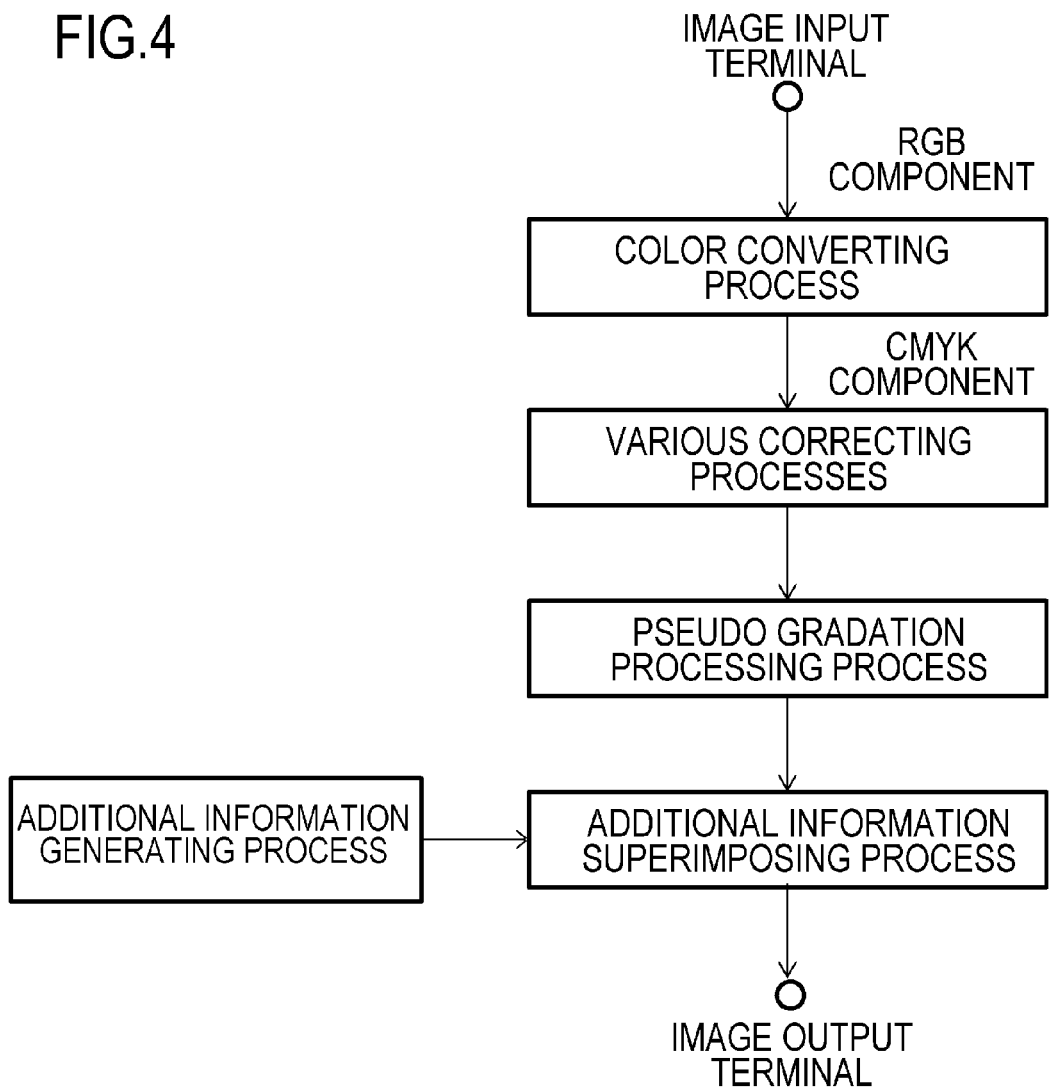
FIG. 4 is a diagram showing a flow of processes executed by an image forming apparatus according to the first embodiment.

FIG. 4 is a diagram showing a flow of processes executed by the image forming apparatus 200 according to the first embodiment. As shown in FIG. 4, a traceable pattern is generated by an additional information generating process which is independent of a normal image information processing process. The traceable pattern is independent of the normal image information processing process in order to prevent the traceable pattern from being intentionally modified by a user. In addition, information on the traceable pattern is added to normal image information by an additional information superimposing process which is performed after the normal image information processing process is finished. In this manner, the traceable pattern is output for each image forming apparatus 200 without being effected by normal image processing processes.

As shown in FIG. 4, image information input from an image input terminal is first converted by a color converting process from RGB (red, green, and blue) information into CMYK (cyan, magenta, yellow, and black) information. Next, the CMYK information is corrected by various correcting processes. For example, since a color expressed in RGB and a color expressed in CMYK do not necessarily match each other, the color expressed in CMYK is corrected so as to approach the color expressed in RGB as much as possible.

In addition, in a pseudo gradation processing process, dithering is performed so as to smooth shading of an image formed on the recording material P as a recording medium. Furthermore, in the additional information superimposing process, additional information generated by the additional information generating process is added to image information. In the present embodiment, in the additional information generating process, information on a traceable pattern for identifying an image forming apparatus having printed special paper currency and the like is generated. Subsequently, image information to which the additional information has been added is output from an image output terminal.

<Normal Image Formation Mode and Wide-Color Gamut Image Formation Mode>

In the present embodiment, the image forming apparatus 200 is capable of executing a wide-color gamut image formation mode in which a color gamut of an image is enlarged in order to form an image with better image quality. In the wide-color gamut image formation mode as a second image formation mode, by varying a peripheral velocity ratio (a ratio of peripheral velocities) between the photosensitive drum 201 and the developing roller 302, a toner supply amount conveyed from the developing roller 302 to the photosensitive drum 201 can be increased. The peripheral velocity ratio (the ratio of peripheral velocities) between the photosensitive drum 201 and the developing roller 302 can be changed by increasing the peripheral velocity of the developing roller 302 or by reducing the peripheral velocity of the photosensitive drum 201.

In the present embodiment, on the photosensitive drum 201 as an image bearing member, a dark-part potential which refers to a potential of a portion not exposed by a laser is set to −500 [V] and a light-part potential which refers to a potential of a portion exposed by the laser is set to −100 [V]. In addition, in the present embodiment, the light-part potential is acquired by measuring a surface of the photosensitive drum 201 with a potentiometer when forming an image pattern (for example, a solid black image) which causes an image to be formed over the entire recording material P. Furthermore, by setting a developing potential of the developing roller to −350 [V], a difference between the light-part potential of the photosensitive drum 201 and the potential of the developing roller 302 and a difference between the dark-part potential of the photosensitive drum 201 and the potential of the developing roller 302 are respectively set to 4250 [V]. Hereinafter, the difference between the light-part potential of the photosensitive drum 201 and the potential of the developing roller 302 and the difference between the dark-part potential of the photosensitive drum 201 and the potential of the developing roller 302 will be referred to as a development contrast.

In addition, with respect to toner to adhere to the developing roller 302 as a developer bearing member, in the present embodiment, a toner amount per unit area (hereafter, denoted by M/S) is set to $3.0 \times 10^{-3}$ [kg/m$^2$]. Furthermore an electrified charge amount of the toner per unit area (hereafter, denoted by Q/S) is set to $-0.15 \times 10^{-3}$ [C/m$^2$]. In the present embodiment, the toner supply amount was confirmed by setting the peripheral velocity of the photosensitive drum 201 to 0.2 [m/s] (constant) and varying the peripheral velocity of the developing roller 302 relative to the photosensitive drum 201. Moreover, a peripheral velocity ratio of 100% is assumed to represent a case where the peripheral velocities of the photosensitive drum 201 and the developing roller 302 are the same and a peripheral velocity ratio of 140% is assumed to represent a case where the peripheral velocity of the developing roller 302 is 1.4 times the peripheral velocity of the photosensitive drum 201. In addition, since a tinge of an image and density of the image are strongly related to each other, the present embodiment will be described with a focus on image density. In the present embodiment, the ratio between the peripheral velocity of the photosensitive drum 201 and the peripheral velocity of the developing roller 302 is increased by increasing the peripheral velocity of the developing roller 302 relative to the peripheral velocity of the photosensitive drum 201.

Figure 5:
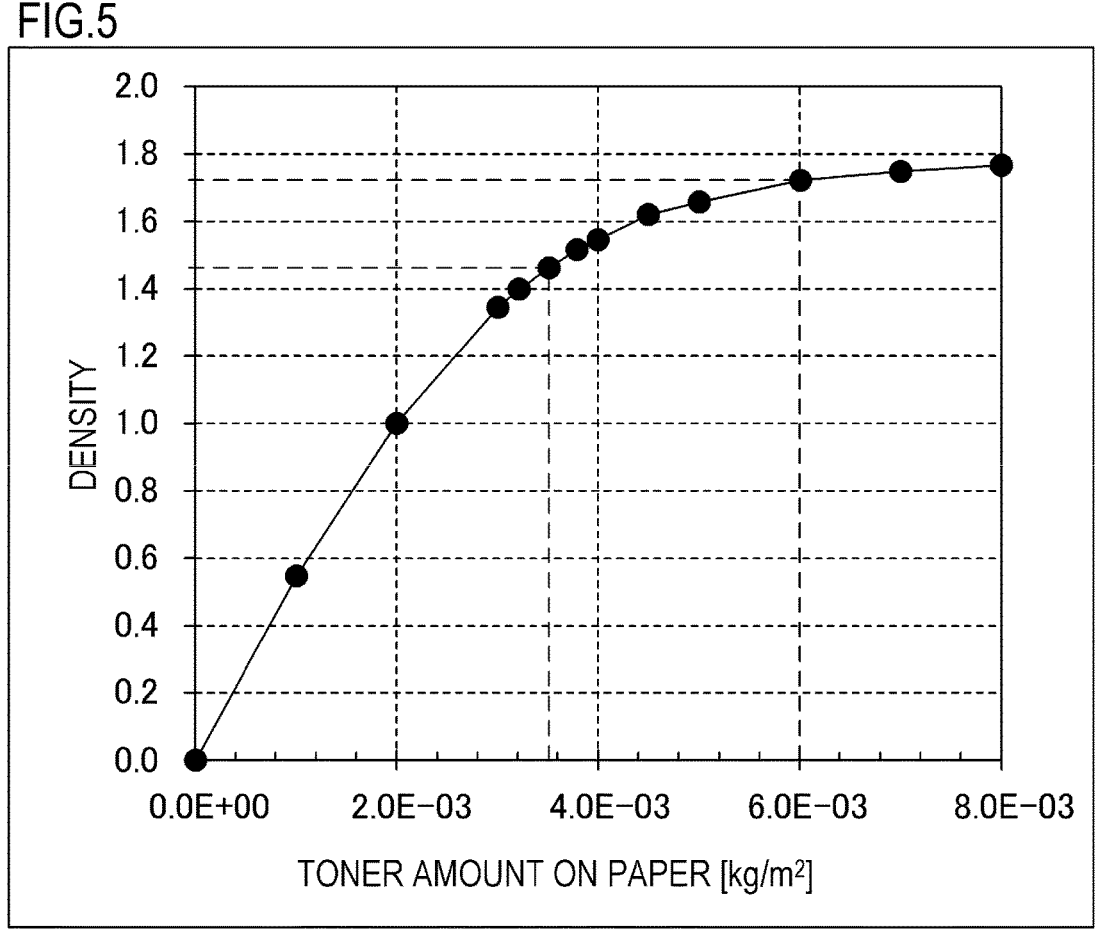
FIG. 5 is a diagram showing a relationship between a toner amount laid on a sheet of paper and density of an image according to the first embodiment.

A toner image formed on the photosensitive drum 201 as an image bearing member is eventually fixed onto the recording material P. FIG. 5 is a diagram showing a relationship between an amount of toner forming an image and density of the image according to the first embodiment. Moreover, since there is no difference among experiment results of the YMC toners, the experiment results will be described using the cyan toner. In the case of a peripheral velocity ratio of 120%, density of 1.45 (Macbeth RD-918) generally required in office documents was obtained and a toner volume level on the recording material P was $3.6 \times 10^{-3}$ kg/m$^2$. When the peripheral velocity ratio was subsequently increased to 200%, density of 1.72 was obtained and the toner volume level on the recording material P was $6.0 \times 10^{-3}$ kg/m$^2$.

In consideration thereof, in the normal image formation mode as a first image formation mode intended for office applications and the like, the peripheral velocity ratio is set to 120% as a first peripheral velocity ratio ΔV1 so that an image density of 1.45 is attained. In addition, in the present embodiment, in the wide-color gamut image formation mode as a second image formation mode, the peripheral velocity ratio is set to 200% as a second peripheral velocity ratio ΔV2 so that an image density of 1.7 or higher is attained. As a result, when changing the peripheral velocity ratio from 120% to 200%, a ΔE target enlargement amount of 10 or larger was secured for red. In this case, "a ΔE target enlargement amount of 10 or larger" means that a value of coordinates in the L*a*b* color system increased by 10 or more. Moreover, red is created by mixing Y and M toners at a ratio of 1:1.

The colors were measured using ilpro manufactured by X-Rite, Incorporated. Measurements were conducted under conditions of a black backing, a D50 light source, and a 2-degree visual field. In addition, GF-0081 manufactured by Canon Inc. was used as paper for sampling. Furthermore, the fixing apparatus 400 was configured to convey the recording material P to a nip portion of the film 430 and the pressure roller 440 after a lapse of 10 seconds from a temperature of an outlet of the nip portion of the film 430 and the pressure roller 440 reaching 180° C.

<Formation of Traceable Pattern>

Conventionally, when confirming a state of a traceable pattern, while the traceable pattern is invisible in the normal image formation mode, there is a risk that the traceable pattern may become visible in the wide-color gamut image formation mode due to increased density of the traceable pattern. In this case, a criterion of a traceable pattern being "invisible" or "visible" is whether or not the traceable pattern affects an original image (an image excluding the traceable pattern) as seen by the naked eye. For example, a traceable pattern is "invisible" if the traceable pattern cannot be identified by the naked eye even when the traceable pattern can be identified through a magnifying glass. In the wide-color gamut image formation mode as a second image formation mode, since a larger amount of toner is supplied to dots forming the traceable pattern, density of the traceable pattern is increased. In addition, in the wide-color gamut image formation mode as a second image formation mode, since a larger amount of toner is supplied to dots forming the traceable pattern, dots forming the traceable pattern become larger than those in the normal image formation mode. Accordingly, there is a risk that a traceable pattern may become visible in the wide-color gamut image formation mode as a second image formation mode.

In consideration thereof, in the present embodiment, when forming an image on the recording material P in the wide-color gamut image formation mode, an amount of laser light is adjusted so that a light-part potential of a portion corresponding to a dot constituting a traceable pattern on the surface of the photosensitive drum 201 equals −400 [V]. In other words, exposure of a portion corresponding to a traceable pattern on the photosensitive drum 201 causes a potential of the portion to become lower than a potential of portions other than that corresponding to the traceable pattern by 260 V. In this case, a light-part potential refers to a potential of a portion exposed by the scanner unit 203 as an exposing apparatus on the photosensitive drum 201. In the present embodiment, when toner adheres to the light part, an electrostatic latent image as an electrostatic image formed on the photosensitive drum 201 is developed as a toner image.

For example, the image forming apparatus 200 may be provided with a storage portion 500 which stores information on the image forming apparatus 200. The storage portion 500 is, for example, a storage medium such as a hard disk drive or a memory. In addition, the storage portion 500 may store, in advance, exposure of a traceable pattern in the normal image formation mode as a first image formation mode and exposure of a traceable pattern in the wide-color gamut image formation mode. In this case, a control portion 600 provided in the image forming apparatus 200 executes a program stored in the storage portion 500 to adjust exposure of a traceable pattern to the set exposure in the normal image formation mode and the wide-color gamut image formation mode. The control portion 600 adds, to image information, additional information (corresponding to first information) regarding exposure of a traceable pattern in the normal image formation mode or additional information (corresponding to second information) regarding exposure of a traceable pattern in the wide-color gamut image formation mode. In addition, based on the image information to which the additional information has been added, the control portion 600 controls exposure by the scanner unit 203 as an exposing apparatus and forms an image on the recording material P.

Figure 6A:
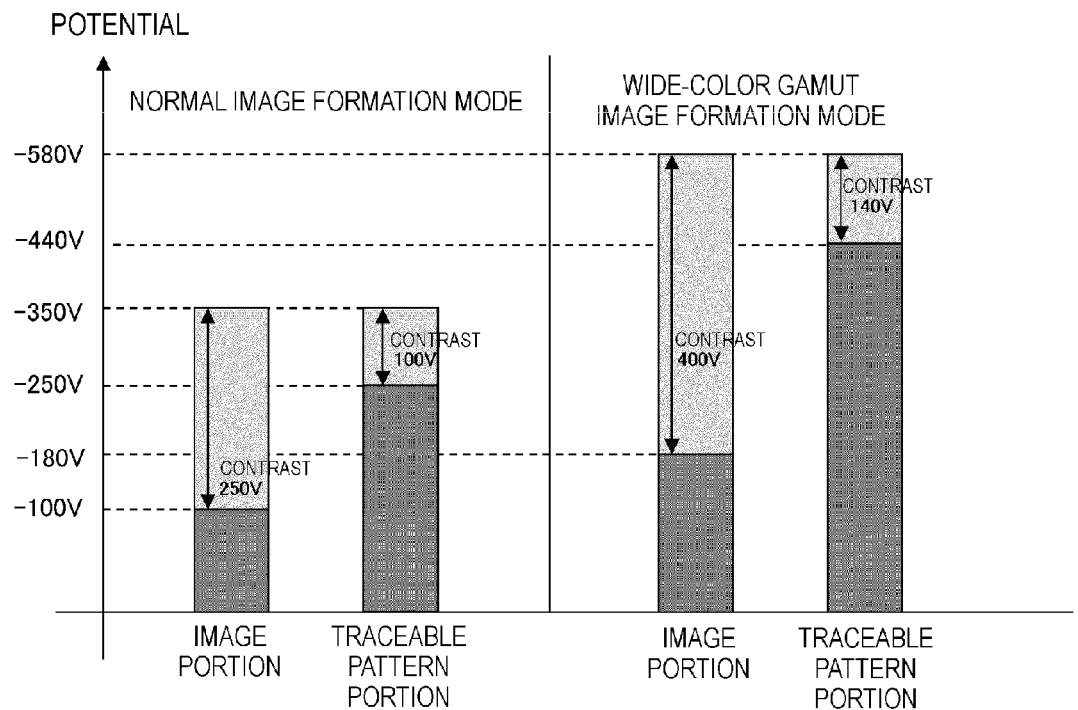
FIGS. 6A and 6B are diagrams showing a relationship between potential of a photosensitive drum and a toner amount laid on a recording material.
Figure 6B:
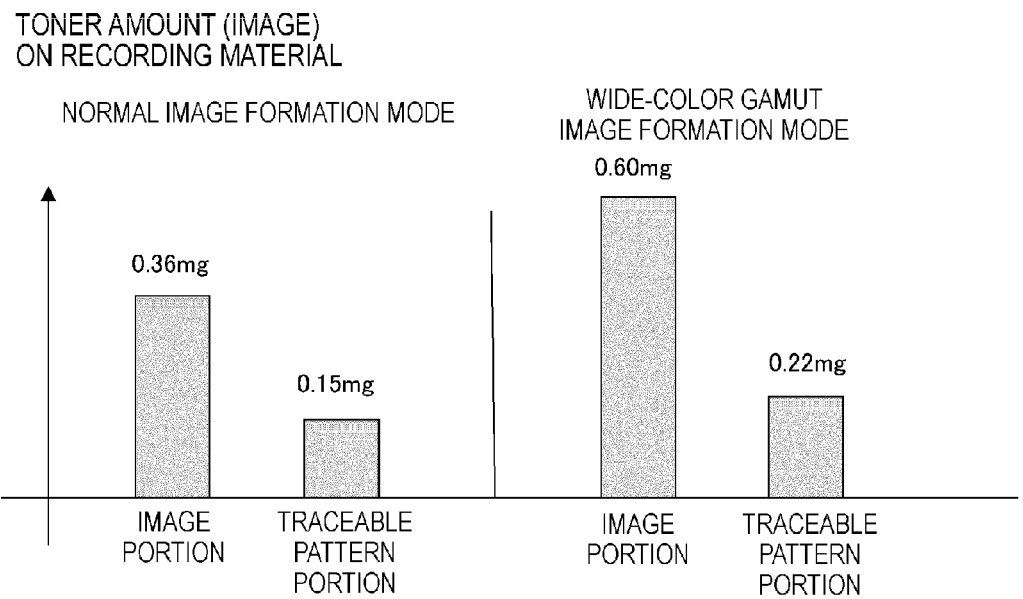

FIG. 6A is a diagram showing potentials on the photosensitive drum 201 of an image portion and a traceable pattern portion in both the normal image formation mode and the wide-color gamut image formation mode according to the first embodiment. The contrast (development contrast) in the drawing refers to a difference between a developing potential and a light-part potential, and an amount in which toner adheres onto the photosensitive drum is determined in proportion to a magnitude of the contrast. Since toner on the photosensitive drum is transferred as-is onto the recording material, a toner volume level on the recording material is also determined in proportion to the contrast. FIG. 6B is a diagram showing toner amounts laid onto the recording material under the respective conditions shown in FIG. 6A. By comparing FIG. 6B with FIG. 6A, it is shown that the toner volume level on the recording material is determined based on a magnitude of the contrast. The following table compiles a potential of each portion and a toner volume level on a recording material under respective conditions.

Let C1 (a first development contrast C1) denote a contrast of the image portion in the normal image formation mode and C2 (a second development contrast C2) denote a contrast of the traceable pattern portion in the normal image formation mode. In a similar manner, let C3 (a third development contrast C3) denote a contrast of the image portion in the wide-color gamut image formation mode and C4 (a fourth development contrast C4) denote a contrast of the traceable pattern portion in the wide-color gamut image formation mode. By reducing the contrast of the traceable pattern portion in comparison to the image portion in the normal image formation mode, a toner volume level of the traceable pattern portion is lower than that of the image portion to make the traceable pattern less visible to the naked eye. In a similar manner, in the wide-color gamut image formation mode, the contrast of the traceable pattern portion is smaller than that in the image portion and a toner volume level of the traceable pattern portion is lower. As a result, even in the wide-color gamut image formation mode, the traceable pattern cannot be identified by the naked eye.

Furthermore, when contrast ratios between the image portion and the traceable pattern portion in the respective modes are denoted by $\Delta C1 = C2/C1$ and $\Delta C2 = C4/C3$, $\Delta C1 = C2/C1 = 100V/250V = 2/5$ and
$\Delta C2 = C4/C3 = 140V/400V = 7/20$ are satisfied, which in turn satisfy a relationship expressed as $\Delta C2 < \Delta C1$.

Since a toner volume level increases in the wide-color gamut image formation mode and a volume level in a traceable pattern portion increases when a contrast ratio remains similar to that in the normal image formation mode, the settings described above are adopted in order to prevent an occurrence of a state where the traceable pattern becomes identifiable to the naked eye. By reducing the contrast ratio in the wide-color gamut image formation mode in comparison to the normal image formation mode, a toner volume level of the traceable pattern portion is suppressed to maintain a state where the traceable pattern is invisible to the naked eye.

Moreover, $\Delta C1$ and $\Delta C2$ can be used as "absolute difference values" instead of "ratios". For example, it can be expressed that $\Delta C1 = |C2 - C1|$ and $\Delta C2 = |C4 - C3|$. In this case, the relationship expressed as $\Delta C2 < \Delta C1$ is also satisfied.

Due to this effect, in the present embodiment, while a toner volume level in the image portion in the wide-color gamut image formation mode is 0.60 mg/m$^2$ which represents an increase of 0.24 mg/m$^2$ from the normal image formation mode, a toner volume level in the traceable pattern portion is 0.22 mg/m$^2$ which represents an increase of only 0.07 mg/m$^2$ from the normal image formation mode. Therefore, compared to the normal image formation mode, in the wide-color gamut image formation mode, the toner

|  | Normal image formation mode | | Wide-color gamut image formation mode | |
| --- | --- | --- | --- | --- |
|  | Image portion | Traceable pattern portion | Image portion | Traceable pattern portion |
| D roller peripheral velocity ratio | 120% | | 200% | |
| Dark-part potential | −500 V | −500 V | −750 V | −750 V |
| Developing potential | −350 V | −350 V | −580 V | −580 V |
| Light-part potential | −100 V | −250 V | −180 V | −440 V |
| Contrast | 250 V | 100 V | 400 V | 140 V |
| Toner volume level (on recording material) | 0.36 mg/m$^2$ | 0.15 mg/m$^2$ | 0.60 mg/m$^2$ | 0.22 mg/m$^2$ | volume level in the traceable pattern portion (specific dot pattern), that is density of the traceable pattern portion is increased at a rate (0.15 mg/m$^2$ to 0.22 mg/m$^2$) lower than another rate (0.36 mg/m$^2$ to 0.60 mg/m$^2$) at which the toner volume level of the image portion (a dot pattern of the image other than the specific dot pattern), that is, density of the image portion is increased. Compared to the toner volume level of the image portion, that is the density of the image portion to be developed, the toner volume level in the traceable pattern portion, that is, the density of the traceable pattern portion to be developed is lowered by adjusting exposure of an electrostatic image corresponding to the traceable pattern portion by the exposing apparatus. According to adjustment of the exposure amount of the present embodiment in the wide-color gamut image formation mode, a potential of a portion, corresponding to the traceable pattern portion on the photosensitive drum 201 in a case where the toner volume level (density) of the traceable pattern portion is increased at 0.07 mg/m$^2$ (the rate) and the toner volume level (density) of the image portion is increased at 0.24 mg/m$^2$ (the another rate), becomes lower than that in a case where the toner volume level (density) of both the traceable pattern portion and the image portion are increased at 0.24 mg/m$^2$ (the another rate). Thus, in the wide-color gamut image formation mode, a difference between (A) a potential of a portion corresponding to the traceable pattern portion in a case where the toner volume level (density) of the traceable pattern portion is increased at 0.07 mg/m$^2$ (the rate) and the toner volume level (density) of the image portion is increased at 0.24 mg/m$^2$ (the another rate) and (B) a potential of the developing roller 302 is smaller than a difference between (i) a potential of a portion corresponding to the traceable pattern portion in a case where the toner volume level (density) of both the traceable pattern portion and the image portion are increased at 0.24 mg/m$^2$ (the another rate) and (ii) the potential of the developing roller 302.

Let M1 (a first developer volume level M1) denote a toner volume level in an image portion (a region corresponding to an image) in the normal image formation mode and M2 (a second developer volume level M2) denote a toner volume level in a traceable pattern portion (a region corresponding to a dot pattern) in the normal image formation mode. In a similar manner, let M3 (a third developer volume level M3) denote a toner volume level in an image portion in the wide-color gamut image formation mode and M4 (a fourth developer volume level M4) denote a toner volume level in a traceable pattern portion in the wide-color gamut image formation mode. When ratios of toner volume levels between the image portion and the traceable pattern portion in the respective modes are denoted by $\Delta M1=M2/M1$ and $\Delta M2=M4/M3$, $\Delta M1=M2/M1=0.15$ mg/m$^2$/0.36 mg/m$^2$=5/12 and
$\Delta M2=M4/M3=0.22$ mg/m$^2$/0.60 mg/m$^2$=11/30 are satisfied, which in turn satisfy a relationship expressed as
$\Delta M2<\Delta M1$.

Moreover, $\Delta M1$ and $\Delta M2$ can also be used as "absolute difference values" instead of "ratios". For example, it can be expressed that $\Delta M1=|M2-M1|$ and $\Delta M2=|M4-M3|$. In this case, the relationship expressed as $\Delta M2<\Delta M1$ is also satisfied.

Moreover, since it is difficult to actually measure a toner volume level in a traceable pattern portion, a measurement of the toner volume levels described herein are substituted by measuring a toner amount when forming a solid image on a recording material under same contrast conditions as a traceable pattern portion.

Normally, when measuring a toner volume level on a recording material, toner is laid onto the recording material under measurement conditions (type of recording material, conditions of respective potentials, and the like) and, without fixing the toner, the toner is collected in an unfixed state and a mass thereof is measured. At the same time, an area of a range onto which the toner had been laid is measured and the "toner volume level" in the table described earlier is calculated based on the measured mass and area of the toner.

For example, when measuring a toner volume level of an image portion in the normal image formation mode, first, toner is laid onto an appropriate recording material (for example, a sheet of Image Coat Gloss 158 manufactured by Canon Inc.) under same conditions as the image portion (D roller peripheral velocity ratio: 120%, dark-part potential: −500 V, developing potential: −350 V, light-part potential: −100 V, and contrast: 250V). An area on which toner is to be laid is set in advance to, for example, a rectangle of 20 mm×50 mm=1000 mm$^2$. By collecting the toner laid onto this range and measuring a mass thereof, the toner volume level (in this case, 0.36 mg/m$^2$) in the table described earlier is calculated. A similar measurement method is used for a toner volume level in the wide-color gamut image formation mode with the exception of changing the D roller peripheral velocity ratio, conditions of respective potentials, and the like to those corresponding to the wide-color gamut image formation mode.

Incidentally, since a traceable pattern portion is usually surrounded by an image portion and finely divided on a recording material, a toner volume level of only the toner volume level cannot be measured by a normal print operation. In consideration thereof, when measuring a toner volume level of a traceable pattern (in this case, the normal image formation mode will continue to be described as an example), the toner volume level of the traceable pattern will be substituted by laying toner onto an appropriate recording material (for example, a sheet of Image Coat Gloss 158 manufactured by Canon Inc.) under same conditions as the traceable pattern portion (D roller peripheral velocity ratio: 120%, dark-part potential: −500 V, developing potential: −350 V, light-part potential: −250 V, and contrast: 100 V) and then measuring a mass of the toner. A measurement of a toner volume level of a traceable pattern portion in the wide-color gamut image formation mode is performed using a similar method by changing the D roller peripheral velocity ratio, conditions of respective potentials, and the like to those corresponding to the wide-color gamut image formation mode.

As described above, in the present embodiment, even in the wide-color gamut image formation mode, a toner volume level on a recording material can be suppressed and a traceable pattern can be prevented from becoming visible by adjusting a contrast on a photosensitive drum.

In the present embodiment, a case has been described in which the two modes of a normal image formation mode as a first image formation mode and a wide-color gamut image formation mode as a second image formation mode are executed. However, modes are not necessarily limited to the above. For example, the image forming apparatus 200 may have two wide-color gamut image formation modes, namely, a first wide-color gamut image formation mode (density: 1.7 or higher, peripheral velocity ratio: 200%) and a second wide-color gamut image formation mode (density: 1.9 or higher, peripheral velocity ratio: 300%). In this case, an amount of laser light which irradiates a portion corresponding to a traceable pattern on the photosensitive drum 201 may be respectively set in the first wide-color gamut image formation mode and the second wide-color gamut image formation mode. Accordingly, in both the first wide-color gamut image formation mode and the second wide-color gamut image formation mode, by adjusting exposure of the portion corresponding to the traceable pattern (by setting a density of the traceable pattern to or below a prescribed density), the traceable pattern can be prevented from becoming visible.

As described above, according to the present embodiment, in the wide-color gamut image formation mode as a second image formation mode, density of a traceable pattern is set lower than the density of the traceable pattern in a case where density of an entire image including the traceable pattern is increased in the wide-color gamut image formation mode. Accordingly, a traceable pattern is prevented from becoming visible to a user in the wide-color gamut image formation mode.

Second Embodiment

Parts of the present embodiment which have same functions as those of the first embodiment will be denoted by the same reference characters and a description thereof will be omitted. In the present embodiment, unlike in the first embodiment, in the wide-color gamut image formation mode, visualization of a traceable pattern is suppressed by increasing spacing between two adjacent dots among a plurality of dots forming the traceable pattern. In this case, a traceable pattern is normally formed by a plurality of dots. In addition, in the present embodiment, separate traceable patterns are respectively set in the normal image formation mode and the wide-color gamut image formation mode. In the present embodiment, in the wide-color gamut image formation mode in which density of an image formed on the recording material P is high (a toner volume level is high), spacing between dots forming a traceable pattern is set wider than in the normal image formation mode. In other words, in the present embodiment, shapes of the traceable pattern are changed between the wide-color gamut image formation mode and the normal image formation mode.

On the other hand, in the normal image formation mode in which density of an image formed on the recording material P is not high, spacing between dots forming a traceable pattern is not widened. In the present embodiment, a traceable pattern formed on the recording material P can be read using a dedicated reading apparatus. In addition, in order to make the traceable pattern easily readable by the reading apparatus, in the normal image formation mode, spacing between the dots forming the traceable pattern is set to an appropriate spacing. In the present embodiment, in the normal image formation mode, spacing between dots forming a traceable pattern is set narrower than in the wide-color gamut image formation mode.

Specifically, for example, the storage portion 500 stores, in advance, a traceable pattern in the normal image formation and a traceable pattern in the wide-color gamut image formation mode. As described above, it is assumed that, in the wide-color gamut image formation mode, spacing between dots forming a traceable pattern is set wider than in the normal image formation mode. In this case, the control portion 600 provided in the image forming apparatus 200 executes a program stored in the storage portion 500 to form a traceable pattern set in advance on the recording material P in the normal image formation mode and in the wide-color gamut image formation mode. The control portion 600 adds, to image information, additional information on a traceable pattern in the normal image formation mode as a first image formation mode, or additional information on a traceable pattern in the wide-color gamut image formation mode. In addition, based on image information to which the additional information has been added, the control portion 600 controls operations of the image forming apparatus 200 so that the traceable pattern is formed and an image is formed on the recording material P. Moreover, the control portion 600 is, for example, a processing unit such as a CPU and is capable of controlling operations of devices inside the image forming apparatus 200 by executing a program stored in the storage portion 500.

Figure 7:
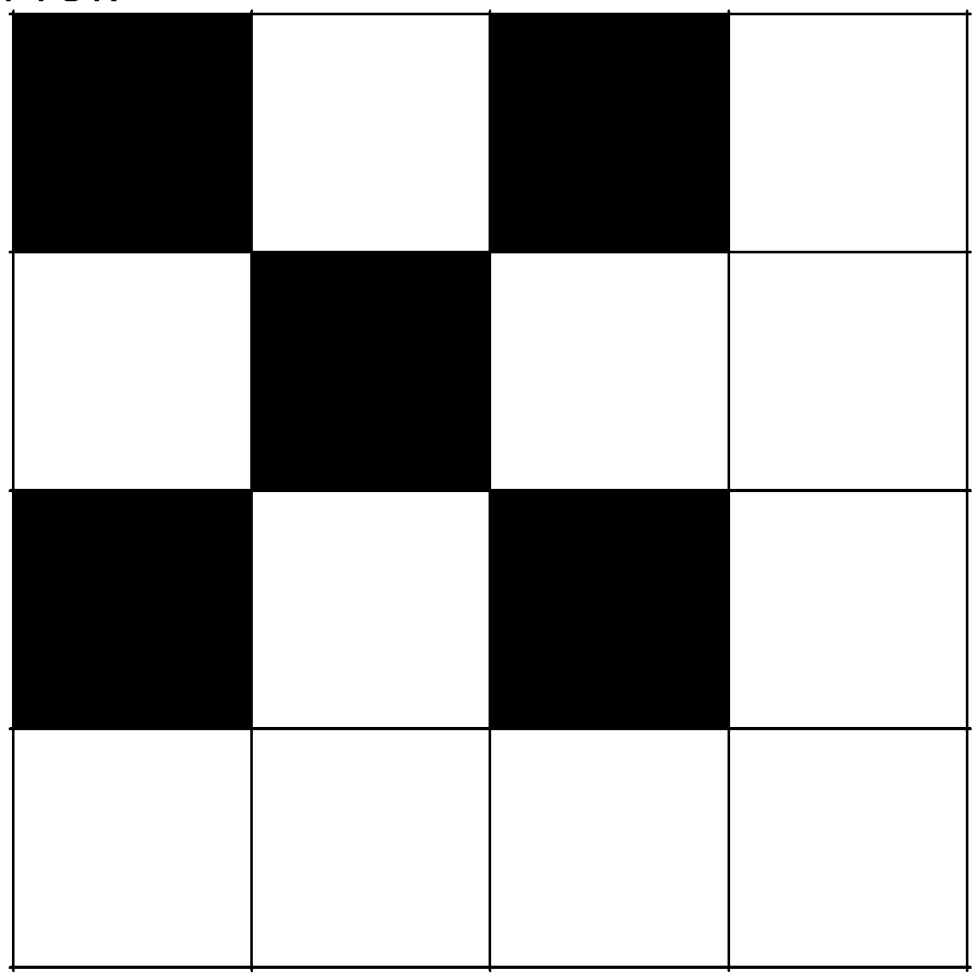
FIG. 7 is a diagram showing a traceable pattern in a normal image formation mode.
Figure 8:
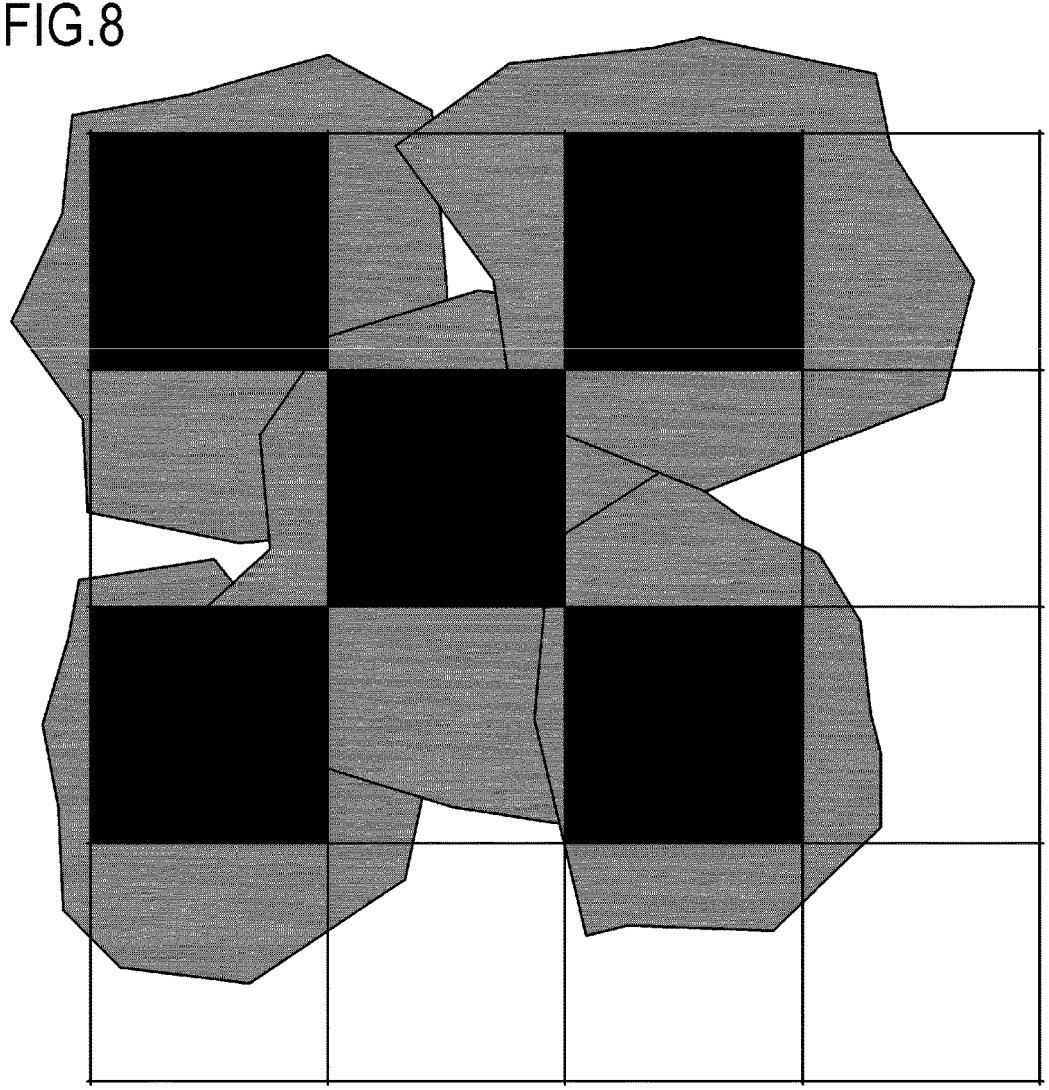
FIG. 8 is a diagram showing a traceable pattern in a wide-color gamut image formation mode.

FIG. 7 is a diagram showing a traceable pattern A formed in the normal image formation mode as a first image formation mode. In addition, FIG. 8 is a diagram showing a traceable pattern B formed in the wide-color gamut image formation mode. For example, let us assume that the traceable pattern formed on the recording material P in the normal image formation mode is the traceable pattern A (refer to FIG. 7). In the normal image formation mode as a first image formation mode, the traceable pattern A is formed on the recording material P on which an image is formed. In this case, the traceable pattern A formed on the recording material P is invisible.

However, when forming the traceable pattern A in the wide-color gamut image formation mode as a second image formation mode, there is a risk that a part of the traceable pattern A may become visible due to an increase of a toner amount per unit area of the traceable pattern A. In the wide-color gamut image formation mode, since a larger amount of toner is laid on the traceable pattern A than in the normal image formation mode, there is a risk that the toner may even spread to blank portions between dots forming the traceable pattern A. In this case, as the blanks between the dots forming the traceable pattern A become filled, as shown in FIG. 8, a plurality of separate dots may merge into one large dot. As a result, there is a risk that the traceable pattern A may become visible.

Figure 9:
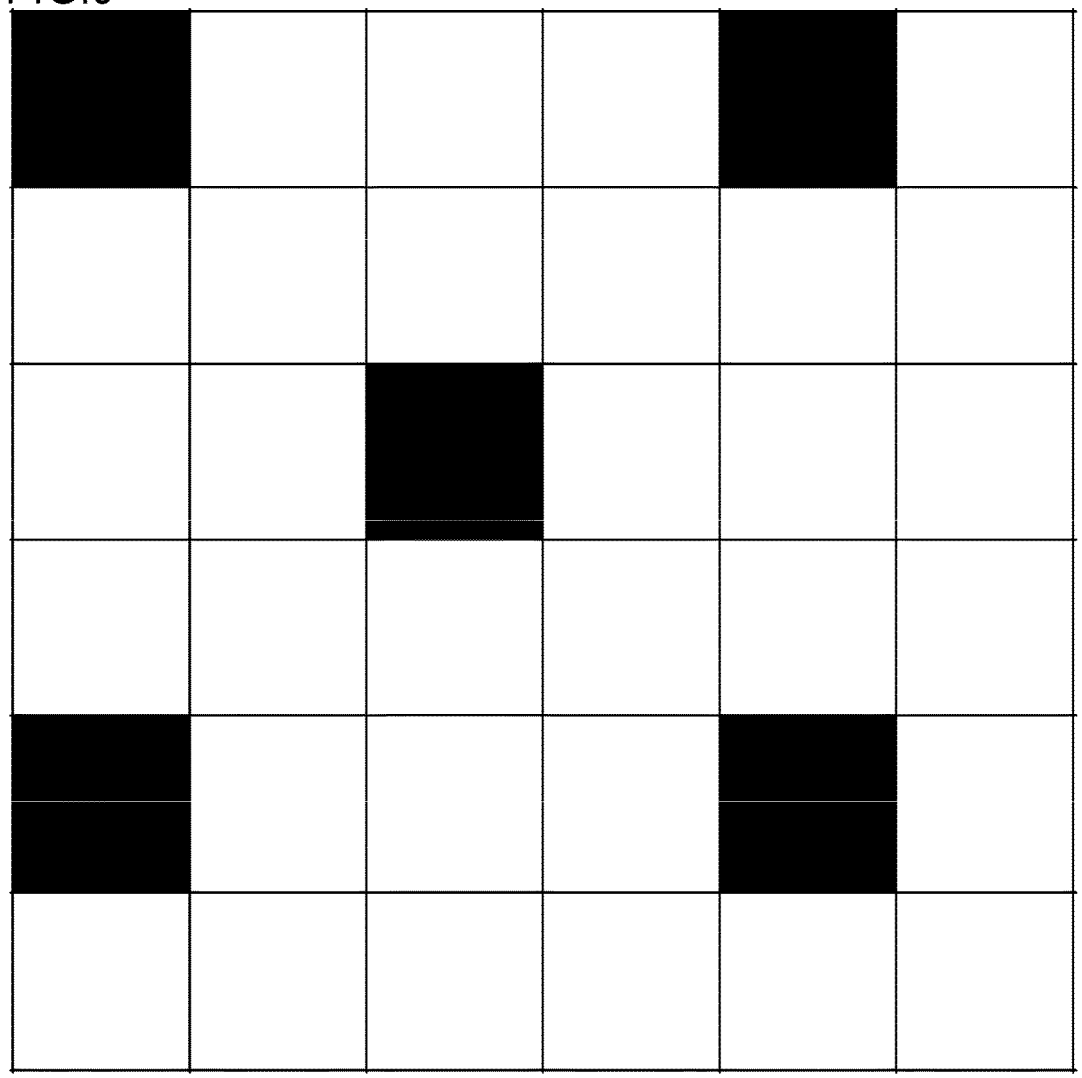
FIG. 9 is a diagram showing a traceable pattern in a normal image formation mode.
Figure 10:
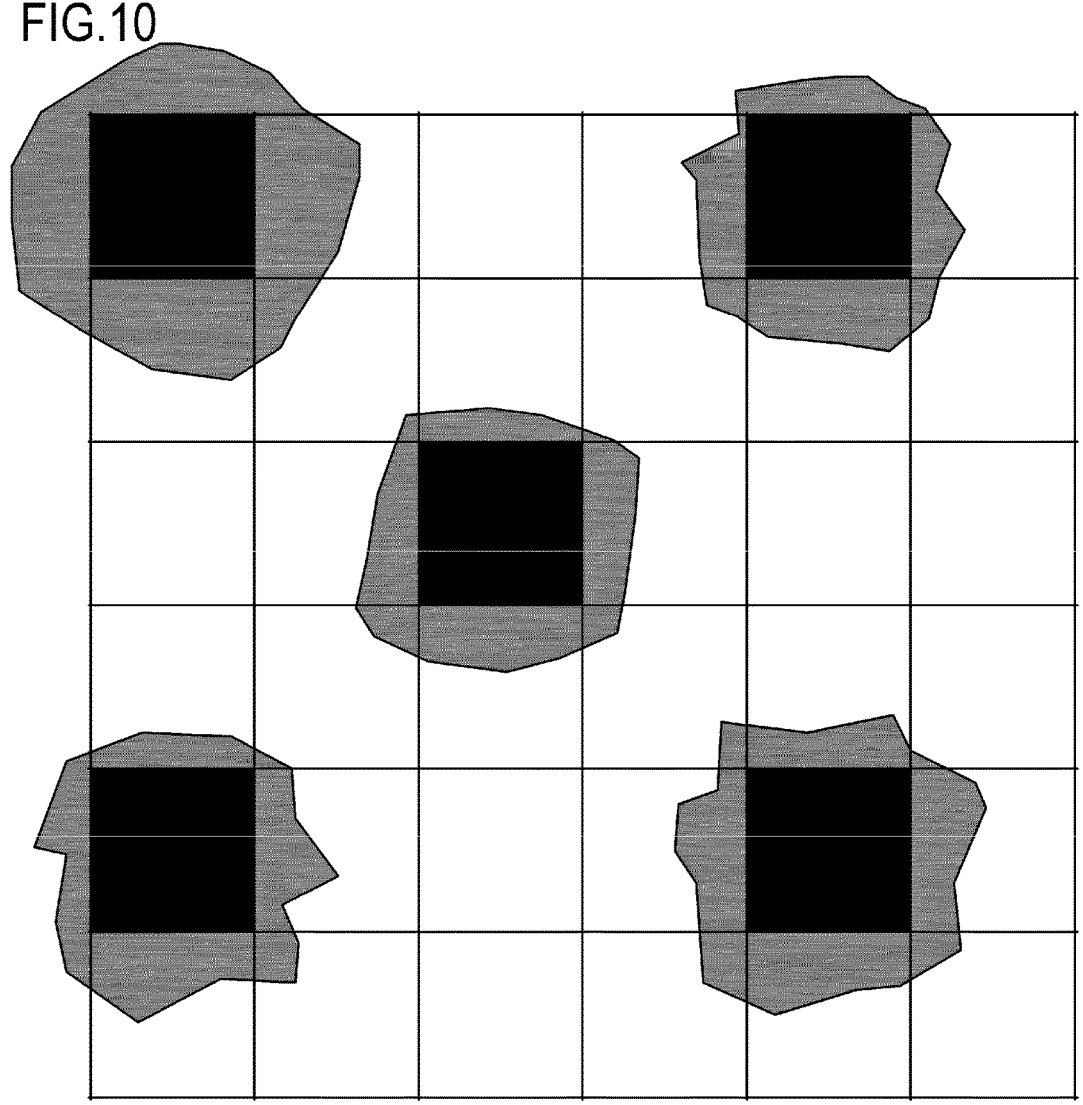
FIG. 10 is a diagram showing a traceable pattern in a wide-color gamut image formation mode.

FIG. 9 is a diagram showing the traceable pattern B in the normal image formation mode as a first image formation mode. In addition, FIG. 10 is a diagram showing the traceable pattern B in the wide-color gamut image formation mode. In the present embodiment, in the first wide-color gamut image formation mode (density: 1.7 or higher, peripheral velocity ratio: 200%), spacing between dots forming the traceable pattern B is widened as shown in FIG. 9. In the present embodiment, by widening the spacing between dots forming the traceable pattern B, a plurality of dots forming the traceable pattern B are prevented from merging into one large dot. As a result, in the first wide-color gamut image formation mode, even when toner is laid in an amount larger than usual on the dots forming the traceable pattern B, since the dots are sufficiently separated from each other, situations where the traceable pattern B becomes visible can be reduced. For the dots to fulfill their roles as a traceable pattern, independency of the dots constituting the traceable pattern must be secured. When the dots constituting a traceable pattern are identifiable, the dots have "independency". On the other hand, in a case where adjacent dots are connected to each other and the dots are not identifiable, the dots do not have "independency". Therefore, in the present embodiment, a dot on which toner is laid is at least not formed adjacent to a dot constituting a traceable pattern. Generally, a traceable pattern is formed in a size of around 3×3 dots (a square with 3 dots on a side) to 5×5 dots (a square with 5 dots on aside). Since authentication performance declines when using a large traceable pattern, a size of a traceable pattern is set to a certain size. In consideration thereof, in the present embodiment, when enlarging the spacing between dots in the wide-color gamut image formation mode, an appropriate size of a traceable pattern is around 10×10 dots (a square with 10 dots on a side).

Figure 11:
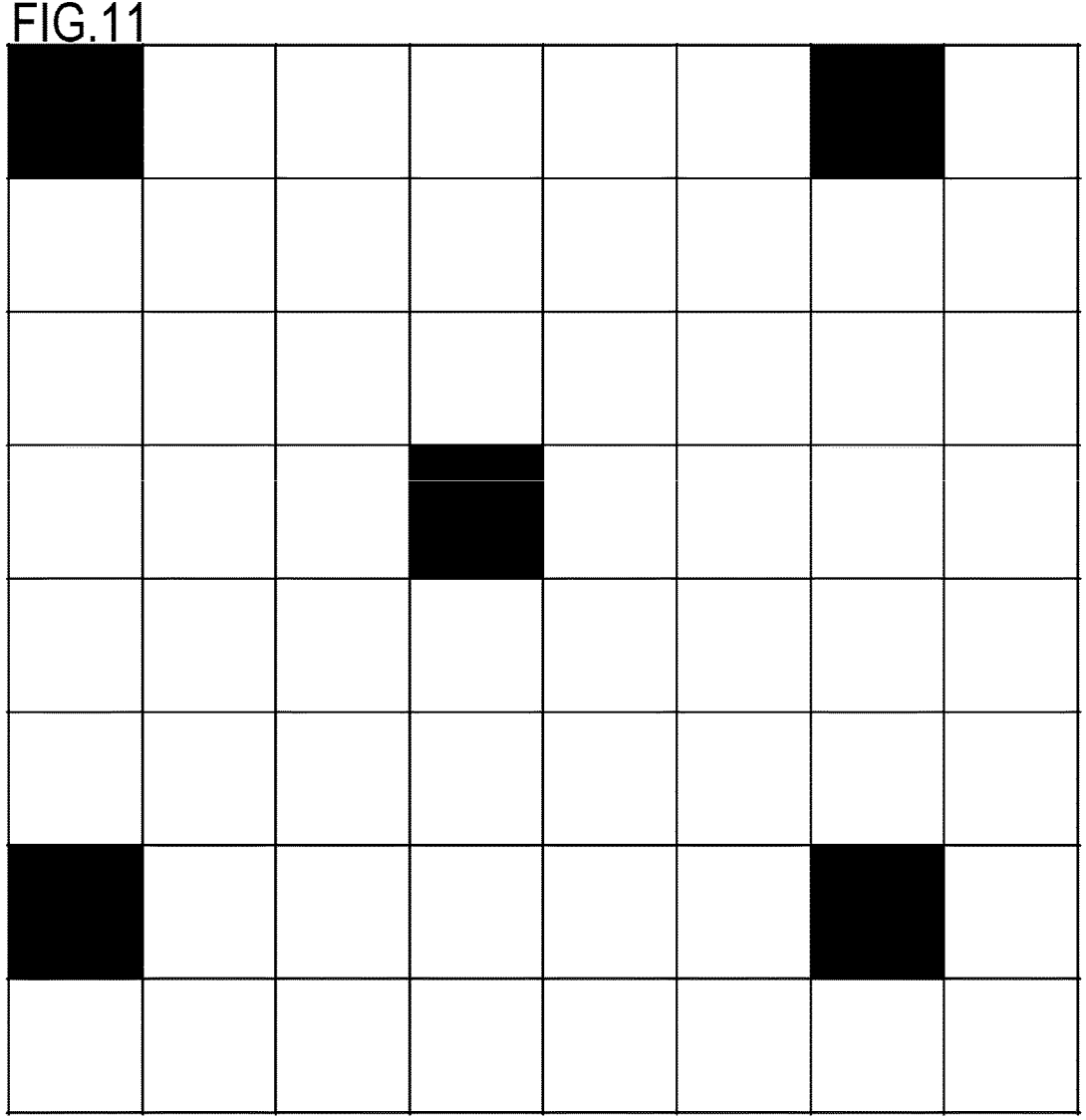
FIG. 11 is a diagram showing a traceable pattern in a normal image formation mode.
Figure 12:
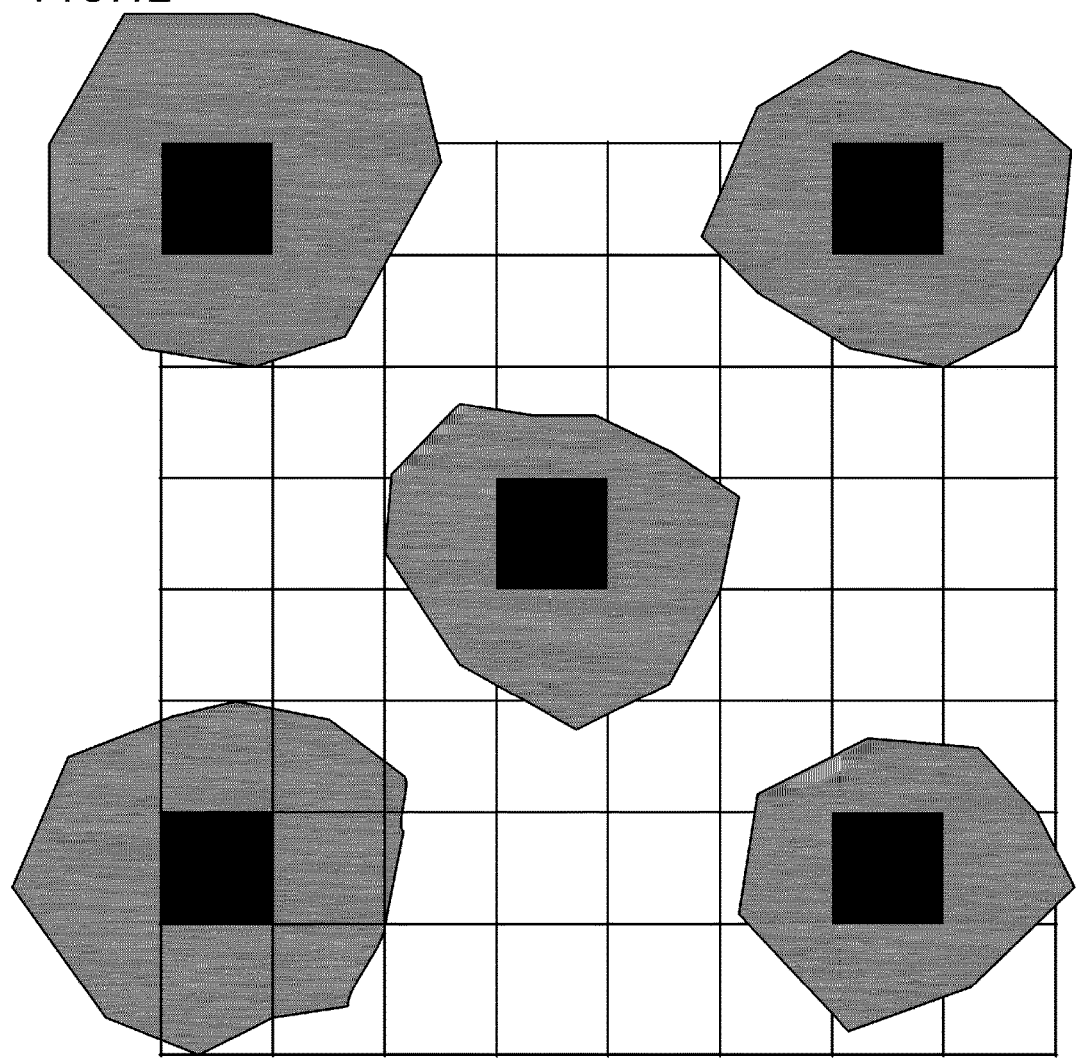
FIG. 12 is a diagram showing a traceable pattern in a wide-color gamut image formation mode.

In addition, FIG. 11 is a diagram showing a traceable pattern C in the normal image formation mode. Furthermore, FIG. 12 is a diagram showing the traceable pattern C in the wide-color gamut image formation mode. In the present embodiment, in the second wide-color gamut image formation mode (density: 1.9 or higher, peripheral velocity ratio: 300%), the traceable pattern C is formed on the recording material P. Spacing between dots forming the traceable pattern C is set wider than the dots forming the traceable pattern B. Therefore, although a toner amount per unit area in the second wide-color gamut image formation mode is larger than a toner amount per unit area in the first wide-color gamut image formation mode, even in the second wide-color gamut image formation mode, the traceable pattern C can be prevented from becoming visible.

As described above, in the present embodiment, in the wide-color gamut image formation mode, spacing between dots forming a traceable pattern is set wider than in a case where density of an entire image including the traceable pattern is increased by the wide-color gamut image formation mode. Accordingly, a traceable pattern is prevented from becoming visible to a user in the wide-color gamut image formation mode.

Moreover, in the respective embodiments, a color gamut and/or density of an image need not necessarily be changed in accordance with a peripheral velocity ratio between the photosensitive drum 201 and the developing roller 302. For example, a color gamut and/or density of an image may be changed by changing exposure by the scanner unit 203 with respect to the photosensitive drum 201.

In addition, in the first embodiment, the exposure by the scanner unit 203 with respect to the photosensitive drum 201 need not necessarily be stored in advance in a storage medium. For example, density of a traceable pattern may be adjusted by correcting the exposure by the scanner unit 203 with respect to the photosensitive drum 201 as an image bearing member.

Furthermore, in the second embodiment, spacing between dots forming a traceable pattern need not necessarily be stored in advance in a storage medium. For example, the spacing between dots forming a traceable pattern may be widened by correcting the spacing between the dots forming the traceable pattern.

In addition, while the traceable pattern A, the traceable pattern B, and the traceable pattern C are used as traceable patterns in the second embodiment, traceable patterns are not limited thereto. Instead of being limited to the traceable patterns A to C, traceable patterns may be used without particular limitation as long as a similar effect can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2016-057714, filed on Mar. 22, 2016, and Japanese Patent Application No. 2017-019608, filed on Feb. 6, 2017, which are hereby incorporated by reference herein in their entirety.

What is claimed is:

1. An image forming apparatus, comprising:
    a rotatable image bearing member on which an electrostatic image is formed;
    a rotatable developer bearing member that supplies a developer to the image bearing member and develops the electrostatic image; and
    processing portion that processes image information so as to add a specific dot pattern to an image to be formed on recording material, wherein the image forming apparatus executes: a first image formation mode in which an image is formed based on the image information by setting a peripheral velocity ratio Vd/Vdr between a peripheral velocity Vd of the developer bearing member and a peripheral velocity Vdr of the image bearing member to a first peripheral velocity ratio ΔVl; and
    a second image formation mode in which an image is formed based on the image information by setting the peripheral velocity ratio Vd/Vdr to a second peripheral velocity ratio ΔV2, which is higher than the first peripheral velocity ratio ΔVl,
    in the first image formation mode, the image forming apparatus forms an image with a first development contrast Cl and forms the specific dot pattern with a second development contrast C2, which is lower than the first development contrast Cl,
    in the second image formation mode, the image forming apparatus forms an image with a third development contrast C3 and forms the specific dot pattern with a fourth development contrast C4, which is lower than the third development contrast C3, and when ΔC1 (=C2/C1) denotes a ratio between the second development contrast C2 and the first development contrast Cl, and ΔC2 (=C4/C3) denotes a ratio between the fourth development contrast C4 and the third development contrast C3,
    ΔC2<ΔC1 is satisfied.

2. The image forming apparatus according to claim 1, wherein by setting density of the specific dot pattern to or below a prescribed density, the specific dot pattern becomes invisible.

3. The image forming apparatus according to claim 1, wherein in the second image formation mode, the specific dot pattern is made less visible by setting density of the specific dot pattern lower than density of the specific dot pattern in a case where density of an entire image including the specific dot pattern is increased by the second image formation mode.

4. The image forming apparatus according to claim 3, further comprising
    an exposing apparatus that forms the electrostatic image on the image bearing member by exposing the image bearing member, wherein
    on the image bearing member, density of the specific dot pattern to be developed is lowered by adjusting exposure of an electrostatic image corresponding to the specific dot pattern by the exposing apparatus.

5. The image forming apparatus according to claim 4, further comprising
    a storage portion that stores prescribed information, wherein exposure of the specific dot pattern in the first image formation mode and exposure of the specific dot pattern in the second image formation mode are stored in the storage portion in advance.

6. The image forming apparatus according to claim 4, wherein in the second image formation mode, when forming an image on a recording medium, exposure of the specific dot pattern is lowered so that a potential of a portion corresponding to the specific dot pattern on the image bearing member becomes lower than a potential of a portion on the image bearing member corresponding to the specific dot pattern in a case where density of an entire image including the specific dot pattern is increased by the second image formation mode.

7. The image forming apparatus according to claim 6, wherein on the image bearing member, density of the specific dot pattern is lowered by making a difference between a potential of a portion on the image bearing member corresponding to the specific dot pattern and a potential of the developer bearing member smaller than a difference between a potential of a portion on the image bearing member corresponding to the specific dot pattern in a case where density of an entire image including the specific dot pattern is increased by the second image formation mode and the potential of the developer bearing member.

8. The image forming apparatus according to claim 7, wherein in the first image formation mode, the exposure of a portion corresponding to the specific dot pattern on the image bearing member is kept unchanged by adding first information, which does not change the exposure of the portion corresponding to the specific dot pattern, to the image information formed on the recording medium.

9. The image forming apparatus according to claim 8, wherein in the second image formation mode, the exposure of a portion corresponding to the specific dot pattern on the image bearing member is changed by adding second information, which changes the exposure of the portion corresponding to the specific dot pattern, to the image information formed on the recording medium.

10. The image forming apparatus according to claim 1, wherein density of the specific dot pattern formed in the second image formation mode is 60% or lower of density of a dot pattern of the image other than the specific dot pattern, which is formed in the second image formation mode.

11. The image forming apparatus according to claim 1, wherein in the second image formation mode, the image forming apparatus enlarges a color gamut of an image formed on a recording medium as compared to the first image formation mode by increasing the peripheral velocity Vd of the developer bearing member relative to the peripheral velocity Vdr of the image bearing member so as to increase the second peripheral velocity ratio $\Delta V2$.

12. The image forming apparatus according to claim 11, wherein in the second image formation mode, the image forming apparatus increases the second peripheral velocity ratio $\Delta V2$ by keeping the peripheral velocity Vdr of the image bearing member constant and only increasing the peripheral velocity Vd of the developer bearing member.

13. The image forming apparatus according to claim 1, further comprising control a unit that executes the first image formation mode and the second image formation mode.

14. An image forming apparatus, comprising:
a rotatable image bearing member on which an electrostatic image is formed;
a rotatable developer bearing member that supplies a developer to the image bearing member and develops the electrostatic image; and
processing portion for processing image information so as to add a specific dot pattern to an image to be formed, wherein the image forming apparatus executes: a first image formation mode in which an image is formed based on the image information by setting a peripheral velocity ratio Vd/Vdr between a peripheral velocity Vd of the developer bearing member and a peripheral velocity Vdr of the image bearing member to a first peripheral velocity ratio $\Delta VI$; and
a second image formation mode in which an image is formed based on the image information by setting the peripheral velocity ratio Vd/Vdr to a second peripheral velocity ratio $\Delta V2$, which is higher than the first peripheral velocity ratio $\Delta VI$,
in the first image formation mode, the image forming apparatus forms an image with a first development contrast CI and forms the specific dot pattern with a second development contrast C2 which is lower than the first development contrast CI,
in the second image formation mode, the image forming apparatus forms an image with a third development contrast C3 and forms the specific dot pattern with a fourth development contrast C4 which is lower than the third development contrast C3, and when $\Delta C1$ (=|C2−CI|) denotes an absolute value of a difference between the second development contrast C2 and the first development contrast CI, and $\Delta C2$ (=|C4−C3|) denotes an absolute value of a difference between the fourth development contrast C4 and the third development contrast C3,
$\Delta C2 < \Delta C1$ is satisfied.

* * * * *